United States Patent [19]

Wildnauer et al.

[11] Patent Number: 5,233,405
[45] Date of Patent: Aug. 3, 1993

[54] OPTICAL SPECTRUM ANALYZER HAVING DOUBLE-PASS MONOCHROMATOR

[75] Inventors: Kenneth R. Wildnauer; James R. Stimple; John D. Knight, all of Santa Rosa; Joseph N. West, Petaluma; Barry G. Broome, Glendora, all of Calif.

[73] Assignee: Hewlett-Packard Company, Palo Alto, Calif.

[21] Appl. No.: 788,444

[22] Filed: Nov. 6, 1991

[51] Int. Cl.⁵ ............................................. G01J 3/18
[52] U.S. Cl. .................................. 356/333; 356/307; 356/328; 356/334
[58] Field of Search ............... 356/307, 308, 326, 327, 356/328, 329, 333, 334, 319

[56] References Cited

U.S. PATENT DOCUMENTS

| | | | |
|---|---|---|---|
| 3,069,967 | 12/1962 | White et al. | 356/334 |
| 3,775,010 | 11/1973 | Chupp et al. | 356/333 |
| 3,936,191 | 2/1976 | Chupp | 356/333 |
| 4,540,282 | 9/1985 | Landa et al. | 356/328 |
| 4,922,309 | 5/1990 | Sekiwa et al. | 356/334 |
| 4,969,739 | 11/1990 | McGee | 356/334 |
| 4,973,159 | 11/1990 | Sohma et al. | 356/334 |

OTHER PUBLICATIONS

Spillman et al, Analytical Chemistry, vol. 48, No. 2, Feb. 1976, pp. 303-311.

Primary Examiner—F. L. Evans
Attorney, Agent, or Firm—William C. Milks, III

[57] ABSTRACT

A double pass scanning monochromator for use in an optical spectrum analyzer includes an input optical fiber for emitting an input light beam, a diffraction grating for diffracting the input light beam to produce a spatially dispersed light beam, a slit for passing a selected portion of the dispersed light beam, a motor for rotating the diffraction grating, a shaft angle encoder for sensing grating position, and an output optical fiber. The light that passes through the slit is directed to the diffraction grating and is recombined by the diffraction grating to produce an output light beam. The light beam to be analyzed is incident on the diffraction grating during first and second passes. A polarization rotation device rotates the polarization components of the light beam by 90° between the first and second passes so that the output of the monochromator is independent of the polarization of the input light beam. The output optical fiber is translated by a micropositioning assembly in a plane perpendicular to the output light beam during rotation of the diffraction grating to automatically track the output light beam and to provide optical chopping.

37 Claims, 17 Drawing Sheets

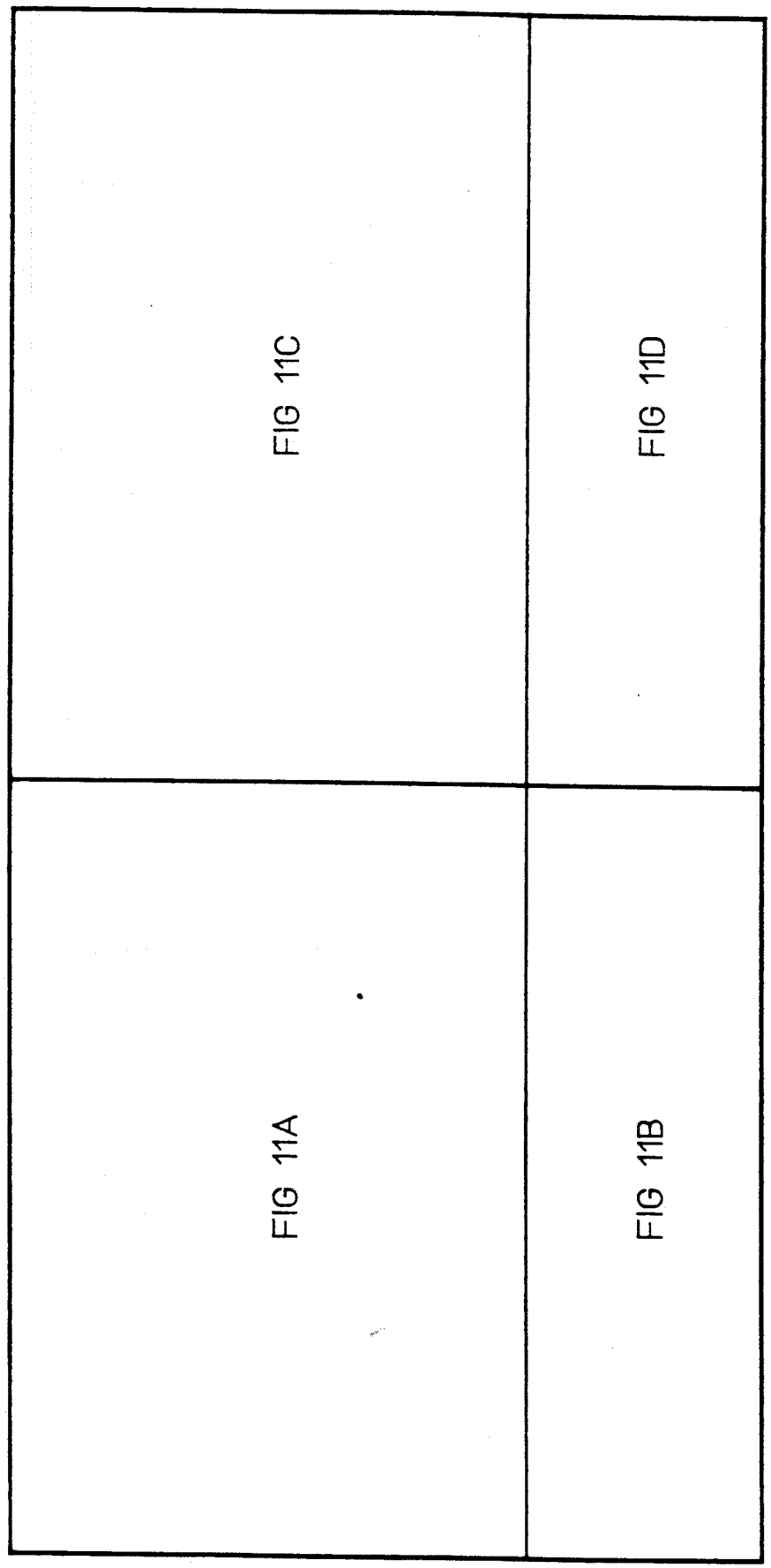

OPTICAL SPECTRUM ANALYZER HAVING DOUBLE-PASS MONOCHROMATOR

FIELD OF THE INVENTION

This invention relates to optical spectrum analyzers and, more particularly, to an optical spectrum analyzer which employs a double pass monochromator with an optical fiber input and an optical fiber output, and which is polarization insensitive and has high sensitivity and a large dynamic range.

BACKGROUND OF THE INVENTION

Optical spectrum analyzers are used for analyzing the output light beams from lasers, light emitting diodes (LED's) and other light sources. Optical spectrum analyzers are particularly useful for analyzing light sources for optical telecommunication, where it is preferable to insure that the optical carrier includes only a single, spectrally pure wavelength. In optical spectrum analyzers, the light intensity is displayed as a function of wavelength over a predetermined wavelength range, as in spectrum analyzers for lower frequency applications. Parameters of importance in optical spectrum analyzers include wavelength range, wavelength and amplitude accuracy, resolution, measurement speed, polarization dependence, sensitivity and dynamic range. As used herein, dynamic range refers to a "close-in" dynamic range and is a measure of the ability of the instrument to measure a low amplitude optical signal that may be separated in wavelength by 0.5–1.0 nanometer from a large amplitude signal. This parameter is of particular importance in analyzing the spectral purity of lasers, such as DFB lasers.

Prior art techniques for optical spectrum analysis have included the use of Michelson interferometers, Fabry-Perot interferometers and monochromators which use a prism or a diffraction grating for spatial dispersion of the input light beam. Michelson interferometers are characterized by poor dynamic range and slow operation. Fabry-Perot interferometers have high resolution but have problems which arise from the multimode nature of the optical cavity.

In a monochromator having a diffraction grating, an input light beam to be analyzed is collimated and is directed at the diffraction grating. The light beam is spatially dispersed by the grating, since different wavelengths are diffracted at different angles. The grating is rotated so that the dispersed light beam is scanned over a slit. The light that passes through the slit is detected to provide an output signal that represents amplitude as a function of wavelength. The width of the slit, the input image size, the f number of the system and the dispersion of the grating establish the resolution of the monochromator.

Single stage monochromators with diffraction gratings have been used in optical spectrum analyzers. Although a single stage monochromator has relatively low cost and high sensitivity, it has a relatively small dynamic range. In addition, when the single stage monochromator has an output optical fiber, the aperture of the output optical fiber limits the optical bandwidth that can be observed. Another problem inherent in single stage monochromators is that the output optical detector must have an effective aperture as large as the widest resolution bandwidth. The larger detector increases the stray light power and the amount of noise at the detector output. Finally, the inherent time dispersion that occurs in a single stage monochromator limits the bandwidth of the modulation that can be observed.

Two stage monochromators with diffraction gratings have eliminated some of the disadvantages of single stage monochromators, but have created other problems. A two stage monochromator involves a second monochromator in series with the first monochromator. Although the two stage monochromator provides relatively high dynamic range, there is a 10-15 dB loss in sensitivity as compared with a single stage monochromator. In addition, accurate synchronization between the diffraction gratings in the first and second stages is difficult, and optical coupling between stages can be difficult. For example, when an optical fiber is used for coupling between stages, the resolution bandwidth is limited by the optical fiber. Furthermore, the two stage monochromator is relatively complex and expensive.

The efficiency of a diffraction grating is dependent on the polarization of the incident light. As a result, the amplitude of the diffracted light beam may vary for input light beams of constant amplitude but different polarizations. Thus, optical spectrum analyzers require a compensation technique to reduce or eliminate polarization sensitivity. Prior art compensation techniques have included polarization scrambling and also spatial separation of the input light beam into two polarizations which are separately analyzed, with different amplifier gains applied to each polarization. In one prior art technique, the input light beam is separated into two spatially separate linear polarizations oriented at 45° relative to the s and p polarizations as defined by the grating. This gives an average efficiency for both beams. All of the known prior art polarization compensation techniques have had one or more disadvantages, including added complexity and difficulty in coupling the light beam to an output optical fiber.

Another problem associated with scanning monochromators is the difficulty in coupling the output light beam to an optical fiber. In particular, mechanical tolerances associated with scanning of the diffraction grating cause the output beam to wander as the grating is rotated. Thus, the output beam position changes as a function of wavelength. In one prior art system, a manual mechanical adjustment is required when the selected wavelength range is changed. In another prior art system, the user must initiate a mechanical adjustment routine when the wavelength range is changed. In either case, alignment is required whenever the wavelength parameters of the measurement are changed.

It is a general object of the present invention to provide improved optical spectrum analyzers.

It is another object of the present invention to provide improved monochromators.

It is a further object of the present invention to provide a double-pass scanning monochromator that utilizes a single diffraction grating.

It is yet another object of the present invention to provide a scanning monochromator that is relatively insensitive to the polarization of the input light beam.

It is a further object of the present invention to provide a scanning monochromator wherein an output optical fiber automatically tracks the output light beam during rotation of the diffraction grating.

It is yet another object of the present invention to provide a scanning monochromator having a large dynamic range and high sensitivity.

It is yet another object of the present invention to provide an optical spectrum analyzer that is easy to manufacture and is low in cost.

SUMMARY OF THE INVENTION

According to the present invention, these and other objects and advantages are achieved in a method and apparatus for analyzing a light beam. A double-pass scanning monochromator according to the invention comprises means for providing an input light beam, a diffraction grating for diffracting the input light beam along a dispersion axis to produce a spatially dispersed light beam, a slit for passing a selected portion of the dispersed light beam to produce a filtered light beam, means for rotating the diffraction grating such that the dispersed light beam is scanned along the dispersion axis, means for directing the filtered light beam to the diffraction grating such that the filtered light beam is recombined by the diffraction grating to produce an output light beam, and an output aperture for receiving the output light beam. The means for providing an input light beam preferably comprises an input optical fiber. The output aperture preferably comprises an output optical fiber.

For operation as an optical spectrum analyzer, the output optical fiber is connected to an optical detector for converting the output light beam to an output electrical signal. The output electrical signal is synchronized with rotation of the diffraction grating to produce a display of optical amplitude as a function of wavelength. Alternatively, the double pass scanning monochromator can be used as an optical filter. In this case, the output light beam is coupled to an output connector for application as required by a user.

The double pass scanning monochromator typically includes optical means for collimating the input light beam prior to incidence on the diffraction grating, for focusing the dispersed light beam at or near the slit, for collimating the filtered light beam prior to incidence on the diffraction grating and for focusing the output light beam at or near an input end of the output optical fiber. The optical means preferably comprises a single lens. The light beam to be analyzed passes through the lens four times in the double pass monochromator. Alternatively, the optical means can comprise a single concave mirror or more than one concave mirror for focusing and collimating the light beams, or a different lens configuration.

In a preferred embodiment of the invention, the input light beam and the dispersed light beam are displaced by equal first distances on opposite sides of the optical axis of the lens, and the filtered light beam and the output light beam are displaced by equal second distances on opposite sides of the lens axis. The center rays of the input light beam, the dispersed light beam, the filtered light beam and the output light beam preferably lie in a plane.

According to an important feature of the invention, the double pass scanning monochromator preferably includes means for rotating the polarization components of the dispersed light beam or the filtered light beam by about 90°. The polarization components, as defined by the grating, of the light passing through the monochromator are rotated by 90° after the first incidence by the light beam on the diffraction grating and prior to the second incidence by the light beam on the diffraction grating. Rotation of the polarization components of the light beam compensates for the fact that the efficiency of the diffraction grating varies with the polarization of the incident light beam. As a result, the amplitude of the output light beam is substantially independent of the polarization of the input light beam. The means for rotating the polarization components by about 90° can be used between the first and second stages of a two stage monochromator to compensate for the polarization dependence of the diffraction gratings.

According to another feature of the invention, the double pass scanning monochromator preferably includes means for causing relative movement between the output optical fiber or other output aperture and the output light beam such that the output aperture remains in alignment with the output light beam during rotation of the diffraction grating. The means for causing relative movement preferably comprises means for translating the output optical fiber in a plane perpendicular to the output light beam to track the output light beam during rotation of the diffraction grating. The means for translating preferably comprises a micropositioning assembly utilizing a flexure plate and linear actuators for controlling translation. The micropositioning assembly compensates for mechanical tolerances and asymmetries in the optical path that may cause the output light beam to wander as a function of diffraction grating position. The means for translating the output optical fiber can be utilized in any scanning monochromator.

The means for rotating the diffraction grating preferably comprises a drive shaft rigidly attached to the diffraction grating and defining an axis of rotation, and a motor for rotating the drive shaft about the axis of rotation. According to a further feature of the invention, the monochromator includes means, directly connected to the drive shaft, for sensing the rotational position of the drive shaft and feedback means responsive to the sensed rotational position and to a sweep signal for controlling the motor. The sensing means preferably comprises a high resolution shaft angle encoder. By utilizing a directly connected shaft angle encoder, the position errors associated with gear drives are eliminated. The motor is preferably directly connected to the drive shaft to permit high speed scanning. Direct drive of the diffraction grating and a directly coupled shaft angle encoder can be used in any scanning monochromator to increase scanning speed and to reduce position errors.

According to a further feature of the invention, the double pass scanning monochromator preferably includes means for causing relative displacement between the output optical fiber or other output aperture and the output light beam such that the output electrical signal of the optical detector is representative only of stray light in the monochromator and electrical noise generated by the optical detector. The output aperture is displaced relative to the output light beam as part of an optical chopping procedure.

According to another feature of the invention, there is provided a method for accurately detecting the output light beam of a monochromator having an output aperture. The method comprises the steps of detecting an output of the monochromator with the output aperture accurately aligned with the output light beam to provide a first measurement, displacing the output aperture relative to the output light beam so that the output light beam is no longer incident on the output aperture, detecting the output of the monochromator with the output aperture displaced from the output light beam to provide a second measurement, and subtracting the second measurement from the first measurement to provide an accurate measurement of the output light beam. The optical chopping technique can be utilized in any scanning monochromator.

According to still another feature of the invention, there is provided a method for intercepting the output light beam of a monochromator having a rotating diffraction grating and an output aperture. The method comprises the steps of measuring the position of the output light beam relative to the output aperture as the diffraction grating is rotated to provide calibration values, and causing relative movement between the output aperture and the output light beam in response to the calibration values so that the output light beam and the output aperture remain in alignment during rotation of the diffraction grating.

BRIEF DESCRIPTION OF THE DRAWINGS

For a better understanding of the present invention, together with other and further objects, advantages and capabilities thereof, reference is made to the accompanying drawings which are incorporated herein by reference and in which:

FIGS 11 and 11A-D illustrate the operator control panel and display screen of an optical spectrum analyzer in accordance with the present invention.

DETAILED DESCRIPTION OF THE INVENTION

Figure 1:
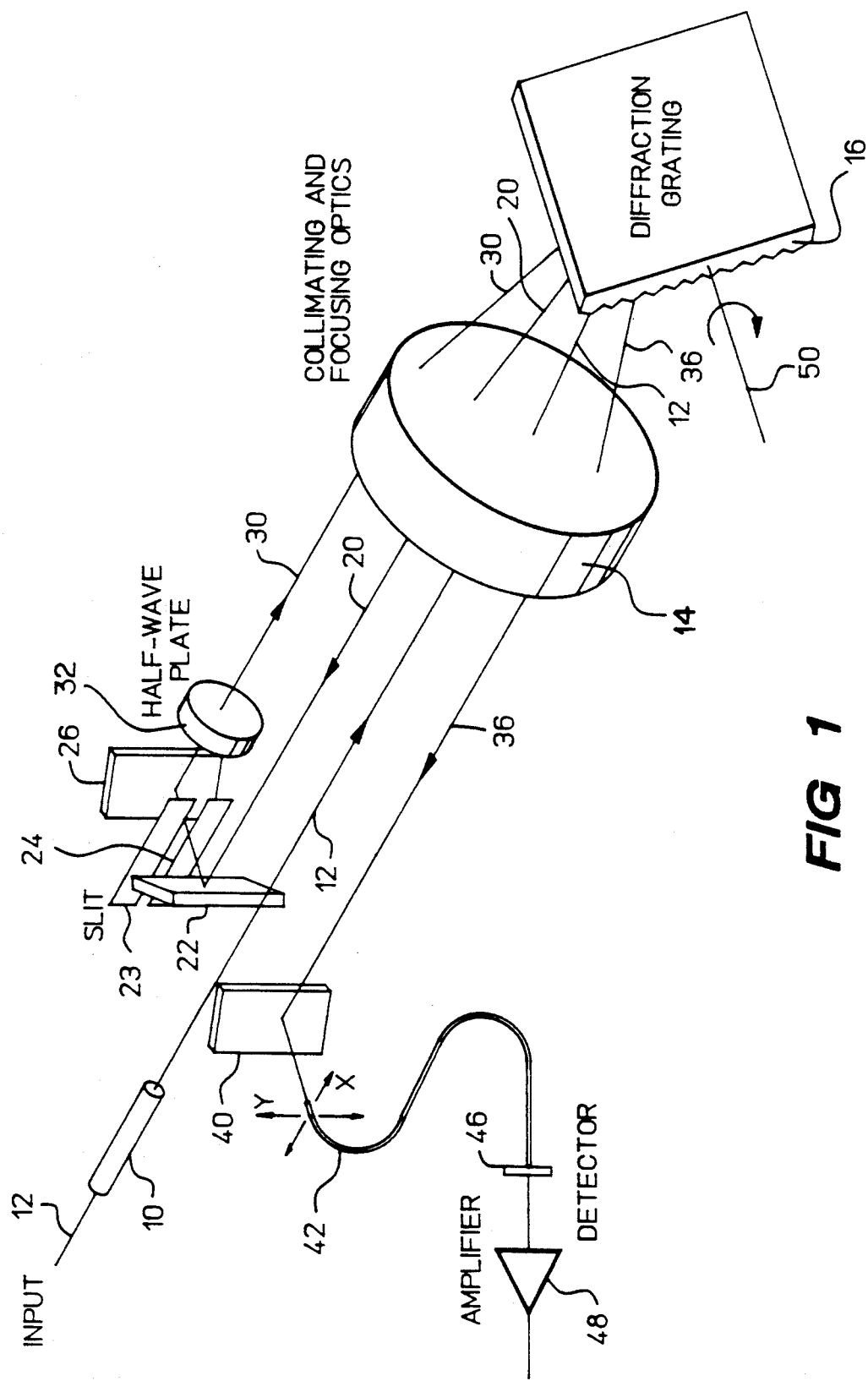
FIG. 1 is a pictorial block diagram of a double-pass scanning monochromator in accordance with the present invention.
Figure 2:
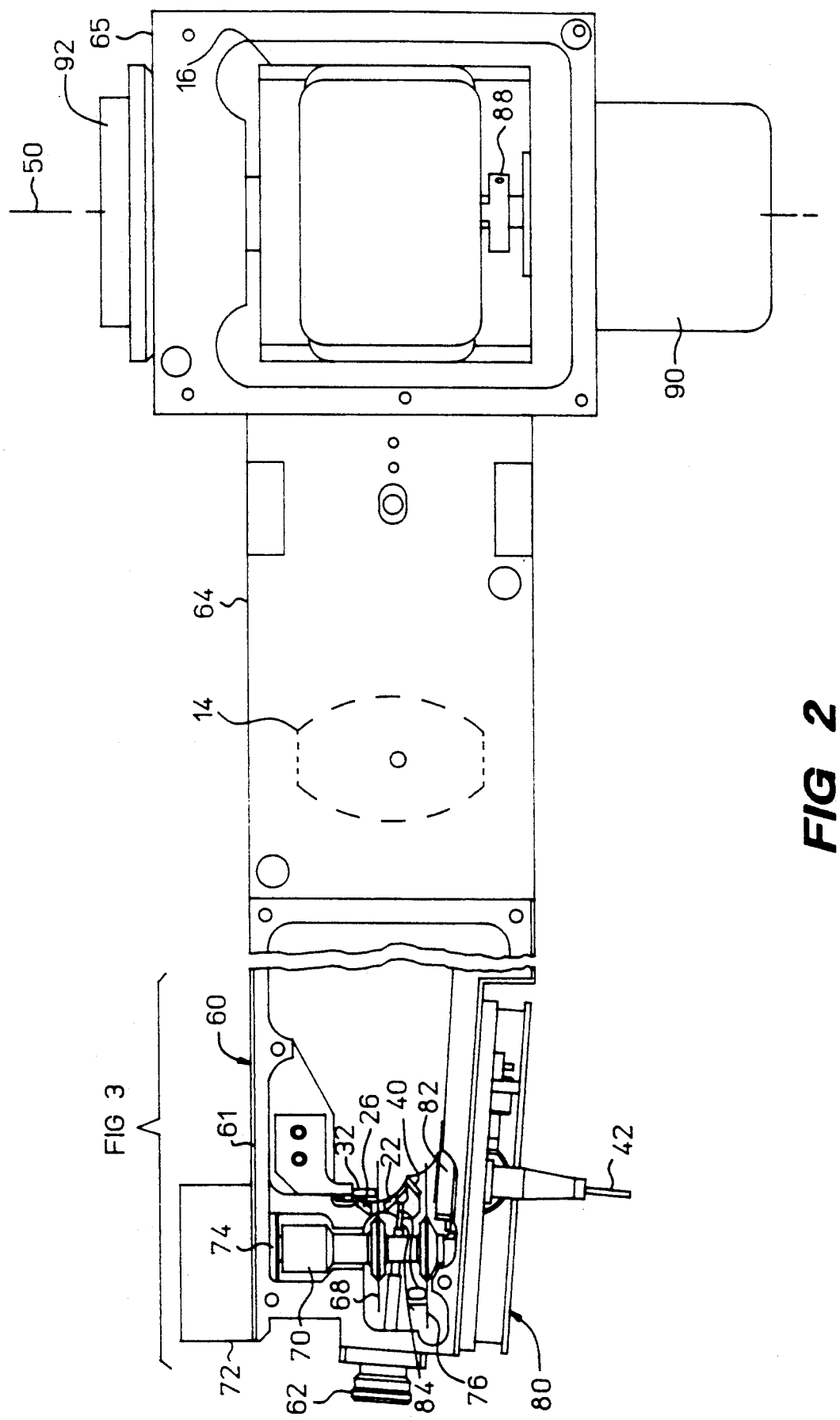
FIG. 2 is a top view of a preferred embodiment of the double-pass scanning monochromator, with covers removed.

A double pass scanning monochromator in accordance with the present invention is shown pictorially in FIG. 1. A preferred embodiment of the monochromator is shown in FIG. 2. An input optical fiber 10 directs an input light beam 12 through a lens 14 to a diffraction grating 16. The input optical fiber 10 acts as an input slit or aperture of the system. The input light beam 12 is collimated by the lens 14 prior to incidence on diffraction grating 16. The diffraction grating 16 diffracts the input light beam 12 to produce a spatially dispersed light beam 20. Since the diffraction grating 16 diffracts different wavelengths at different angles, as is well known, the input light beam 12 is spatially separated into its component wavelengths.

The spatially dispersed light beam 20 passes through lens 14 and is reflected by a mirror 22 to an aperture plate 23 having a slit 24 that determines the resolution of the monochromator. The dispersed light beam 20 is focused by lens 14 at the plane of slit 24. The slit 24 passes a selected portion of the dispersed light beam 20. As discussed below, slits 24 with different widths are used to provide different resolutions. The slit 24 acts as a spatial filter of the dispersed light beam 20 to produce a filtered light beam 30. At the slit 24, there is both wavelength dispersion and time dispersion of the input light beam.

The filtered light beam 30 is reflected by a mirror 26 through a half-wave plate 32 and lens 14 to the diffraction grating 16. The filtered light beam 30 is collimated by lens 14 prior to incidence on grating 16. Filtered light beam 30 is directed to diffraction grating 16 such that both time and wavelength dispersion are collapsed by diffraction grating 16 to form an output light beam 36. The output light beam 36 is reflected by a mirror 40 to an input end of an output optical fiber 42. The output optical fiber 42 acts as a secondary, or output, aperture to further filter the light. The output light beam 36 is carried by optical fiber 42 to an optical detector 46 which converts the output light beam 36 to an output electrical signal. The output electrical signal is amplified by an amplifier 48.

Although the double pass monochromator preferably utilizes an output optical fiber, the double pass monochromator can be constructed with a small detector mounted at the same position as the input end of optical fiber 42. Alternatively, a large detector having a slit or pinhole aperture can be mounted at the same position as the input end of optical fiber 42.

The diffraction grating 16 is rotated about an axis of rotation 50 to provide scanning of the spatially dispersed light beam 20 with respect to slit 24. The axis of rotation 50 is selected such that the direction of scan is the same as the axis of dispersion. The light passing through slit 24 represents a scan across a selected wavelength range of the input light beam 12. The width of slit 24 determines the system resolution. By using a narrow slit, a narrow wavelength band of the input light beam is selected. However, the light power passing through a narrow slit is small and may be below the sensitivity level of the detector for a weak light beam. Wider slits pass a larger amount of light power. However, since the selected portion of the dispersed light beam is increased, wavelength resolution is decreased.

The monochromator shown in FIG. 1 is characterized as a double-pass monochromator because the light beam is incident upon the diffraction grating 16 twice and passes through the lens 14 four times. A first pass includes input light beam 12 incident on diffraction grating 16 and spatially dispersed light beam 20 incident on slit 24. The light that passes through slit 24 is effectively the output of the first pass. A second pass includes filtered light beam 30 incident on diffraction grating 16 and output light beam 36 incident on output optical fiber 42. The mirror 22 is oriented at 40.3° with respect to dispersed light beam 20, and mirror 26 is oriented at 49.7° with respect to filtered light beam 30. The function of mirrors 22 and 26 is to reverse the direction of the light for the second pass and to offset light beam 30 from light beam 20. The mirrors 22 and 26 are positioned at angles other than 45° to cause the beam to hit the slit 24 at a slight angle to prevent reflections and also to increase the physical path length of the second pass in order to account for the change in optical path length caused by the half-wave plate 32. Although the aperture plate 23 that defines slit 24 is positioned between mirrors 22 and 26, it will be understood that other configurations can be used.

Because of the orientation of the mirrors 22 and 26 with respect to the dispersion plane of diffraction grating 16, the second time the light beam is incident on the grating 16, it is oriented so as to collapse both the time and wavelength dispersion that were produced on the first pass, rather than dispersing the light beam even more. The collapsing of the time and wavelength dispersion can be understood from the fact that the diffraction grating can be operated in a reciprocal fashion. Thus, when the grating is illuminated with white light of many wavelengths, the light is diffracted, or spread out, in different angles by the grating. When the same light is reflected back at the same angles that it was diffracted by the grating, it is recombined by the grating into the original white light. Thus, the diffracted light is spread out spatially by the diffraction grating 16 on the first pass and is recombined spatially by the diffraction grating 16 on the second pass. If there were no aberrations in the system, the light would be imaged back to its original input spot size. At the input end of optical fiber 42, the output light beam 36 remains in fixed position and is spatially recombined in spite of the spatial dispersion and scanning that occurs in the monochromator.

Figure 5:
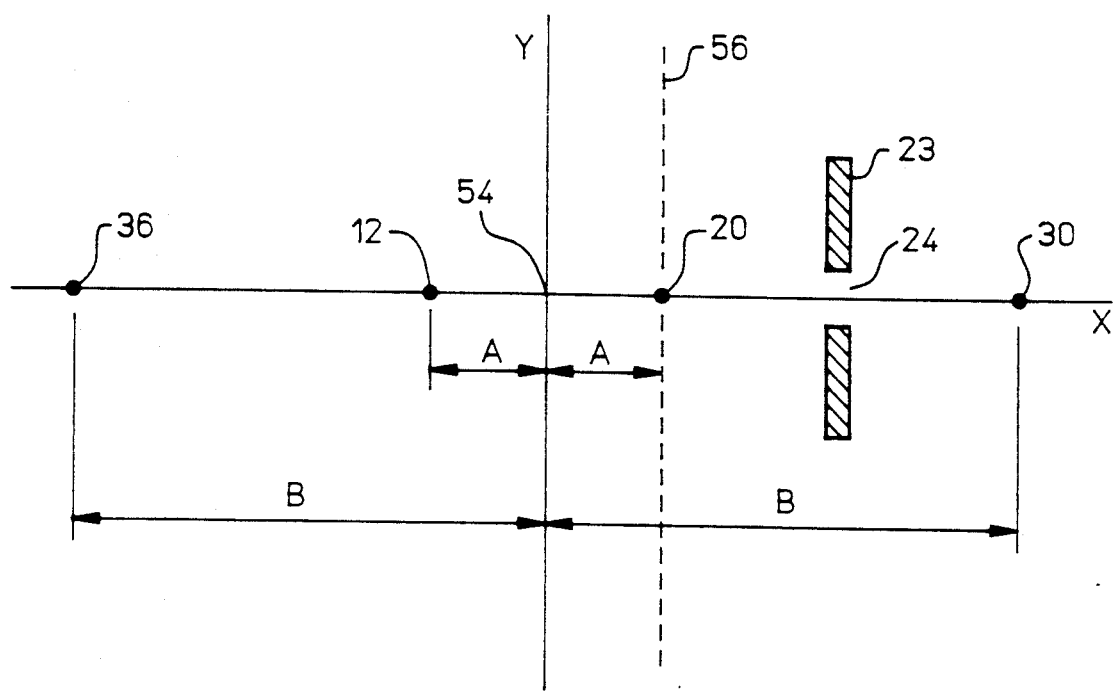
FIG. 5 is a graph showing the positions of the various light beams relative to the lens axis at the input end of the double pass scanning monochromator.

The relative positions of the various light beams in the monochromator of FIG. 1 are illustrated in FIG. 5. The X and Y axes represent directions perpendicular to an optical axis 54 of lens 14. The origin of the X-Y coordinate system shown in FIG. 5 is the lens axis 54. It will be understood that the spots shown in FIG. 5 represent a central ray of each of the light beams. The input light beam 12 is displaced by a distance A on one side of lens axis 54, and the dispersed light beam 20 is displaced by an equal distance A on the opposite side of lens axis 54. Similarly, the filtered light beam 30 is displaced by a distance B on one side of lens axis 54, and the output light beam 36 is displaced by a distance B on the opposite side of lens axis 54. In a preferred embodiment, distance A is 1.1 millimeters and distance B is 4.3 millimeters. It will be understood that the double pass monochromator can be configured such that the four light beams have a different pattern from the linear arrangement shown in FIG. 5. For example, the four light beams can be positioned at the corners of a square or a parallelogram.

In FIG. 5, a line 56 represents the dispersion axis. The different wavelength components of the input light beam 12 are spatially dispersed along dispersion axis 56 by the diffraction grating 16. Also, as diffraction grating 16 is rotated about axis 50, the dispersed light beam 20 moves along dispersion axis 56 and is scanned over slit 24. Although the light beam 20 is spatially dispersed along axis 56 and is scanned along dispersion axis 56, the output light beam 36 remains fixed in position as a result of the recombination of the beam components by diffraction grating 16 on the second pass, as described above.

In the double pass monochromator of FIG. 1, the lens 14 collimates the input light beam 12 prior to incidence on the diffraction grating 16, focuses the dispersed light beam 20 at or near the slit 24, collimates the filtered light beam 30 prior to incidence on the diffraction grating 16 and focuses the output light beam 36 at or near the input end of the output optical fiber 42. Thus, the light to be analyzed passes through the lens 14 four times as it traverses the monochromator, and the collimating and focusing functions are performed by a single lens. It will be understood that the collimating and focusing functions can advantageously be performed by a single concave mirror or more than one concave mirror. Alternatively, a concave diffraction grating can be used. In the case of a concave diffraction grating, collimating and focusing optics are not required.

The output light beam 36 is focused on the input end of optical fiber 42. The optical fiber 42 acts as an aperture for the second pass of the double pass monochromator. In one example of the monochromator, the optical fiber 42 has a core diameter of 62.5 micrometers. It will be understood that output optical fibers with different diameters can be used within the scope of the present invention. The slit 24 serves as the aperture for the first pass of the double pass monochromator. The slit 24 and the aperture of the optical fiber 42 together provide the optical equivalent of a two pole filter to provide increased selectivity.

Figure 6:
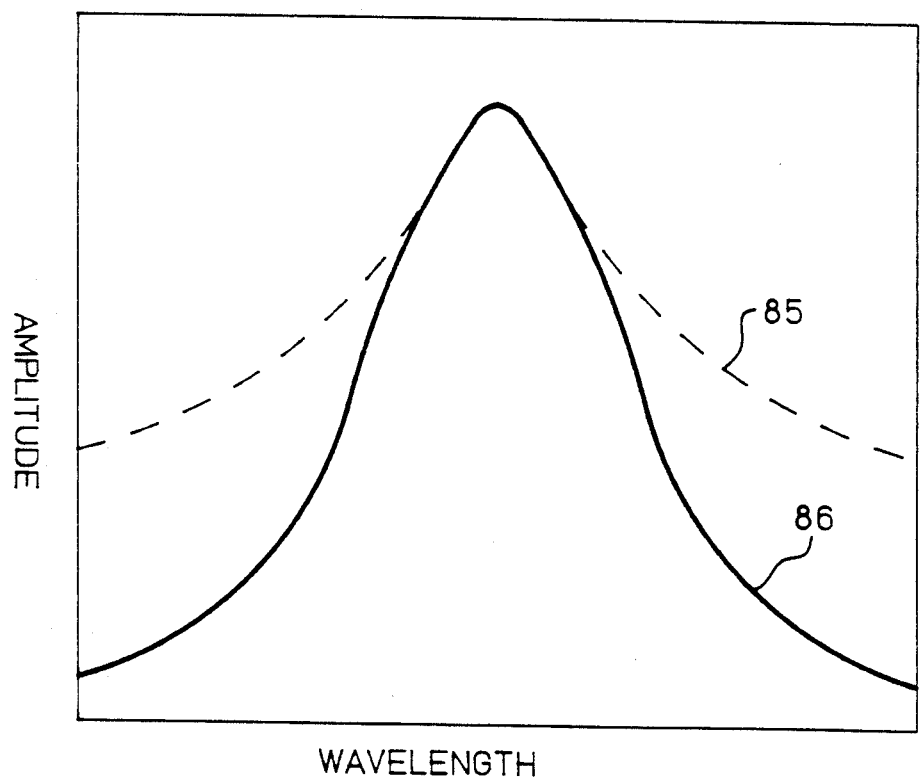
FIG. 6 is a graph showing output amplitude as a function of wavelength for a single stage monochromator in accordance with the prior art and a double-pass monochromator in accordance with the present invention.

A comparison of the selectivity obtained with the double pass monochromator of the present invention and a single stage monochromator is illustrated in FIG. 6. Output amplitude is plotted as a function of wavelength for a monochromatic light input. Curve 85 represents a single stage monochromator in accordance with the prior art. Curve 86 represents the double-pass monochromator of the present invention. The increased selectivity of the double pass monochromator provides high "close-in" dynamic range.

An advantage of the disclosed monochromator configuration is that the output aperture as defined by optical fiber 42 remains fixed for different widths of slit 24. Thus, optical detector 46 can have a very small input aperture and therefore a very low noise level. The aperture of optical detector 46 remains fixed for different resolution settings of the monochromator.

Referring again to FIG. 1, the half-wave plate 32 rotates the polarization components, as defined by grating 16, of the filtered light beam 30 by 90°. The purpose of the half-wave plate 32 is to compensate for the fact that the diffraction grating 16 typically has an efficiency that varies with the polarization of the light that is incident upon it. In this context, efficiency refers to diffracted wave intensity relative to incident wave intensity. Without compensation for polarization, the intensity of the output light beam 36 would vary as a function of the polarization of the input light beam 10, even though the intensity of the input light beam is constant.

By rotating the polarization components of the light passing through the monochromator by 90° between the first and second passes, polarized light is diffracted with different efficiencies on the first and second passes. On the first diffraction from grating 16, light polarized in the vertical direction is diffracted with an efficiency for s polarized light, and light polarized in the horizontal direction is diffracted with an efficiency for p polarized light. It will be recognized that any input light beam includes vertically and horizontally polarized components (either of which may be zero). After the light beam goes through the half wave plate 32, the vertical component is rotated to become the horizontal component, and the horizontal component is rotated to become the vertical component. On the second diffraction from grating 16, the original vertical component is diffracted with the efficiency for p polarized light because, due to the rotation by the half wave plate 32, the light is oriented in the p direction. Similarly, the original horizontal component is diffracted with the efficiency for s polarized light. Thus, for any input polarization, the final optical output of the monochromator is a function of the product of the s and p efficiencies of grating 16.

Although a half wave plate 32 is shown in FIG. 1 and described above, any optical element capable of rotating the polarization components of light by 90° can be utilized. Examples of suitable optical elements for rotation of polarization are a Fresnel Rhomb, a Faraday rotator, an achromatic half-wave plate or retarder, etc. The half-wave plate 32 has its principal axis aligned at 45° with respect to the lines on the grating 16. This alignment can be shown to cause a 90° rotation of the polarization components.

The general requirements on the optical device for rotating polarization components by 90° are as follows. The device must rotate the polarization components by approximately 90° over the wavelength range of interest. The polarization rotation device is positioned in the optical path between the first incidence of the light beam to be analyzed on the diffraction grating 16 and the second incidence of the light beam on the diffraction grating. Thus, the polarization rotation device can, in principle, be located in the path of dispersed light beam 20 or in the path of filtered light beam 30.

Figure 12:
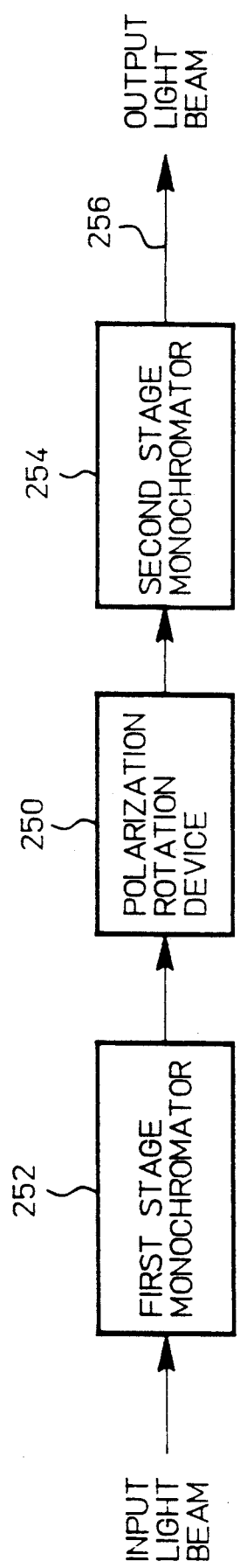
FIG. 12 is a block diagram of a two stage monochromator incorporating a polarization rotation device and an output optical fiber.

A polarization rotation device can also be used to reduce or eliminate polarization dependence in a two stage monochromator as shown in FIG. 12. In this case, a polarization rotation device 250 is located in the light path between the diffraction grating of a first stage monochromator 252 and the diffraction grating of a second stage monochromator 254. The light beam must be optically coupled from the first stage monochromator 252 to the second stage monochromator 254 with bulk optics which preserve polarization (except for the polarization rotation device 250) or with a polarization preserving optical fiber. According to another feature of the present invention, the two stage monochromator shown in FIG. 12 is provided with an output optical fiber 256. The output optical fiber 256 functions as an output aperture of the second stage monochromator 254 in a manner similar to the output optical fiber 42 shown in FIG. 1 and described above. It will be understood that the polarization rotation device 250 and the output optical fiber 256 can be used separately or in combination in the two stage monochromator.

As described above, the output light beam 36 remains in a fixed position at the input end of optical fiber 42 even though the dispersed light beam is scanned over slit 24. While the output light beam remains fixed in an ideal system, mechanical errors, such as mechanical misalignment of the diffraction grating 16 and a slight asymmetry in the system, cause the output light beam to undergo a small movement as the diffraction grating 16 is rotated. Due to the small aperture of the output optical fiber, the output light beam 36 may not be intercepted by the output optical fiber when the beam moves. Clearly, misalignment between the output light beam 36 and optical fiber 42 would cause measurement errors.

In accordance with another feature of the invention, the double pass scanning monochromator of the present invention is provided with means for translating optical fiber 42 in a plane perpendicular to a longitudinal axis of fiber 42 and perpendicular to output light beam 36. The plane of translation is represented schematically in FIG. 1 by X and Y directions. The optical fiber 42 is translated so as to track the output light beam 36 during rotation of the diffraction grating 16. The tracking occurs automatically during scanning of diffraction grating 16 so that the output light beam 36 remains in fixed alignment with the input end of optical fiber 42. A preferred technique for tracking and a micropositioning assembly for translating optical fiber 42 are described in detail below. While tracking of the output light beam 36 by translation of optical fiber 42 is preferred, it will be understood that tracking can be performed by translation or rotation of any optical element in the monochromator which will cause the output light beam to remain aligned with the output aperture during rotation of the diffraction grating.

Figure 3:
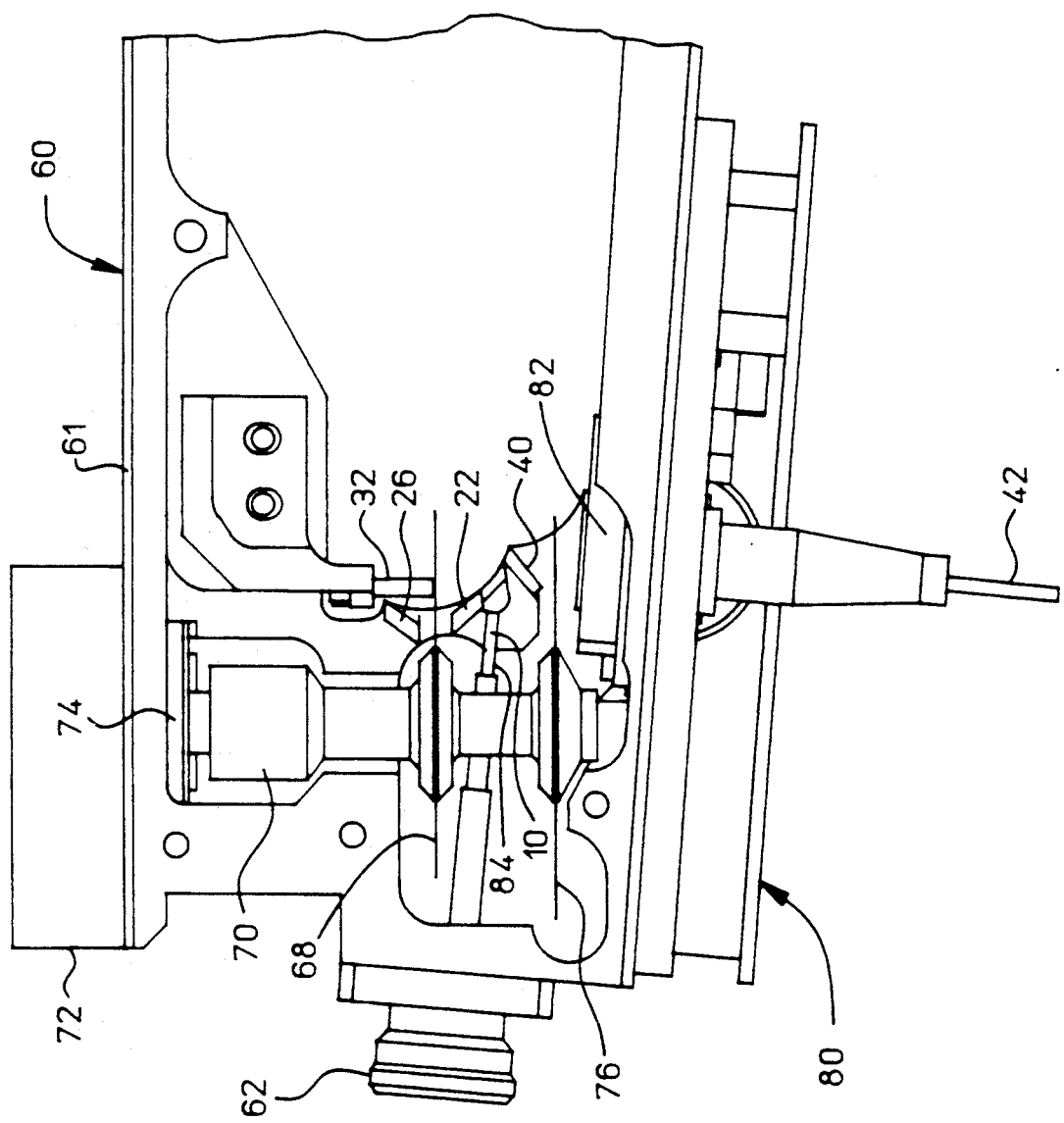
FIG. 3 is an enlarged top view of the input end of the double-pass scanning monochromator.
Figure 4:
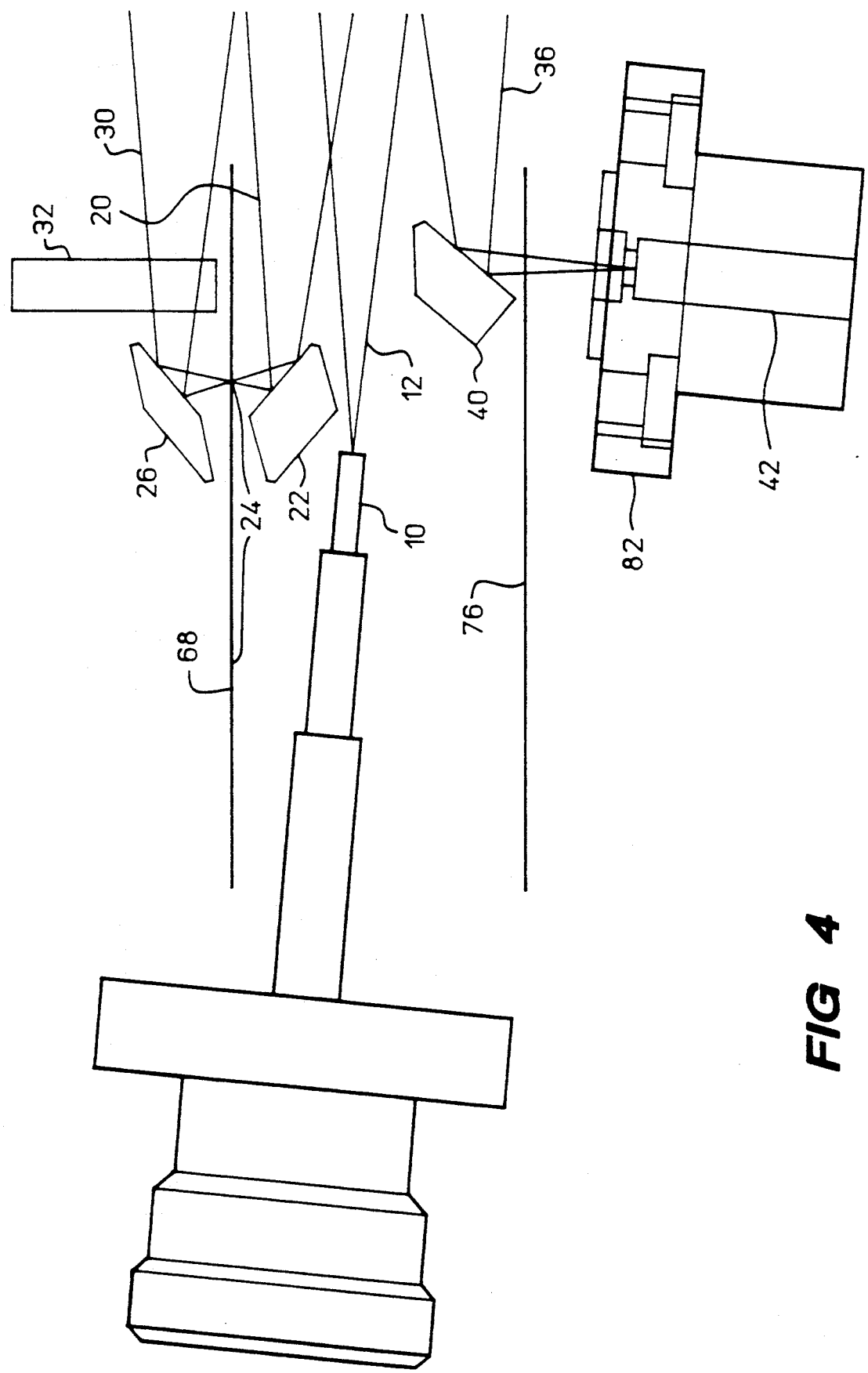
FIG. 4 is an enlarged top view of the optical elements and light beams at the input end of the double-pass scanning monochromator.

A preferred embodiment of the double-pass scanning monochromator in accordance with the invention is shown in FIG. 2. An enlarged view of the input end is shown in FIG. 3 for clarification. An enlarged view of the input end showing only optical elements and light beams is shown in FIG. 4. The optical elements of the monochromator are mounted in a machined housing 60. An input end 61 provides mounting for input optical fiber 10, mirrors 22, 26 and 40 and half-wave plate 32. An input optical connector 62 permits attachment of a light source to be analyzed. Output optical fiber 42 is connected to the input end 61 of housing 60. The lens 14 is located in a central portion 64 of housing 60, and diffraction grating 16 is mounted in a portion 65 of housing 60. The input end 61 and housing portion 65 are shown with covers removed.

As described above, the slit 24 establishes the system resolution. Different slits can be selected to provide different system resolutions. As shown in FIG. 4, plurality of slits 24 are formed radially in a disk 68. In a preferred embodiment, 11 slits range in width from 7.5 micrometers to 1.8 millimeters. The disk 68 is attached by a drive shaft 70 to a motor 72. The motor 72 rotates disk 68 so that a slit of the desired width is positioned in the beam path. A shaft angle encoder 74 senses the rotational position of disk 68, and the position information is used in a servo loop to ensure accurate positioning of the selected slit 24 relative to the light beam.

Also attached to shaft 70 is a disk 76. A portion of the disk 76 is positioned in the light path between mirror 40 and output optical fiber 42. During normal operation of the monochromator, the output light beam 36 passes through an aperture in disk 76 and is unaffected by disk 76. The disk 76 is used in a zeroing mode. In the zeroing mode, the disk 76 is rotated by motor 72 such that light is blocked from reaching output optical fiber 42. Also, disk 68 is rotated such that light is blocked. In this condition, the electrical output level of optical detector 46 and amplifier 48 corresponding to zero light input is determined for compensation for electronic drifts in the detector electronics.

A micropositioning assembly 80 is mounted to the input end 61 of housing 60 to provide positioning of output optical fiber 42. As discussed above, the output optical fiber 42 is moved in a plane perpendicular to output light beam 36 during rotation of diffraction grating 16 to ensure accurate alignment between the output light beam 36 and output optical fiber 42. The output optical fiber 42 attached to the micropositioning assembly 80 by an adaptor 82. The micropositioning assembly 80 is described in detail below.

The tip of input optical fiber 10 from which input light beam 12 is emitted is beveled at a small angle, typically about 6.0°, to reduce reflections toward the light source being analyzed. The input light beam 12 is emitted from optical fiber 10 at an angle with respect to its longitudinal axis, and optical fiber 10 is mounted at an angle with respect to the lens axis. The optical fiber 10 is mounted in a glass capillary 84 for support.

The diffraction grating 16 is rigidly mounted to a drive shaft 88 for rotation about axis 50. A drive motor 90 is directly connected to drive shaft 88 without any intervening gear trains. The motor 90 is mounted to housing portion 65. A high resolution incremental optical shaft angle encoder 92 is mounted to housing portion 65 and includes an encoder disk attached directly to drive shaft 88. The encoder 92 senses the rotational position of shaft 88. By direct attachment of encoder 92 to the drive shaft 88 for diffraction grating 16, position errors associated with gear train backlash, lubricant thickness and wear are eliminated. Direct attachment of the motor 90 to the shaft 88 reduces control problems due to gear train backlash and wear, and improves speed of operation. The operation of the motor 90 and encoder 92 to provide high speed scanning and highly accurate positioning of diffraction grating 16 is described below.

The lens 14 focuses and collimates the light beams in the monochromator over the wavelength range of operation. In a preferred embodiment, the monochromator operates over a range from 1250 to 1600 nanometers, with reduced performance parameters over a range of 600 to 1700 nanometers. A preferred lens 14 is an achromatic triplet using three different glass types and compensated for off-axis operation to achieve the desired performance over a broad wavelength range. The lens 14 is diffraction limited, and in a preferred embodiment, has a focal length of 150 millimeters and a clear aperture of 36.1 millimeters.

The focal length of the lens 14 changes as a function of temperature. This is primarily due to changes in the index of refraction of the lens glass with temperature. In order to compensate for this effect and to keep the lens focused at the desired focal plane, it is necessary to physically move the lens with respect to the focal plane as the temperature changes. The preferred lens exhibits an increase in focal length with temperature of about 15 micrometers/° C. The thermal expansion of the aluminum frame over the distance from the focal plane to the lens is not sufficient to compensate for this effect. The lens is therefore mounted in a tube constructed from Invar, which is mounted to the frame at an appropriately larger distance from the focal plane.

The mirrors 22, 26 and 40 are required to have high quality surfaces with substantially constant reflectance over the wavelength range of operation. A preferred coating is gold. The half-wave plate 32 is required to provide a substantially constant 90° rotation of polarization components, or 180° retardance, over the wavelength range of operation. A preferred half-wave plate is a 2.1 millimeters thick compound zero order retarder consisting of quartz and $MgF_2$ sandwiched together to produce the desired 180° retardance over the wavelength range of operation. In addition, the half-wave plate 32 is antireflection coated over the wavelength range to minimize reflections and to prevent resonances in the wavelength response.

Figure 7A:
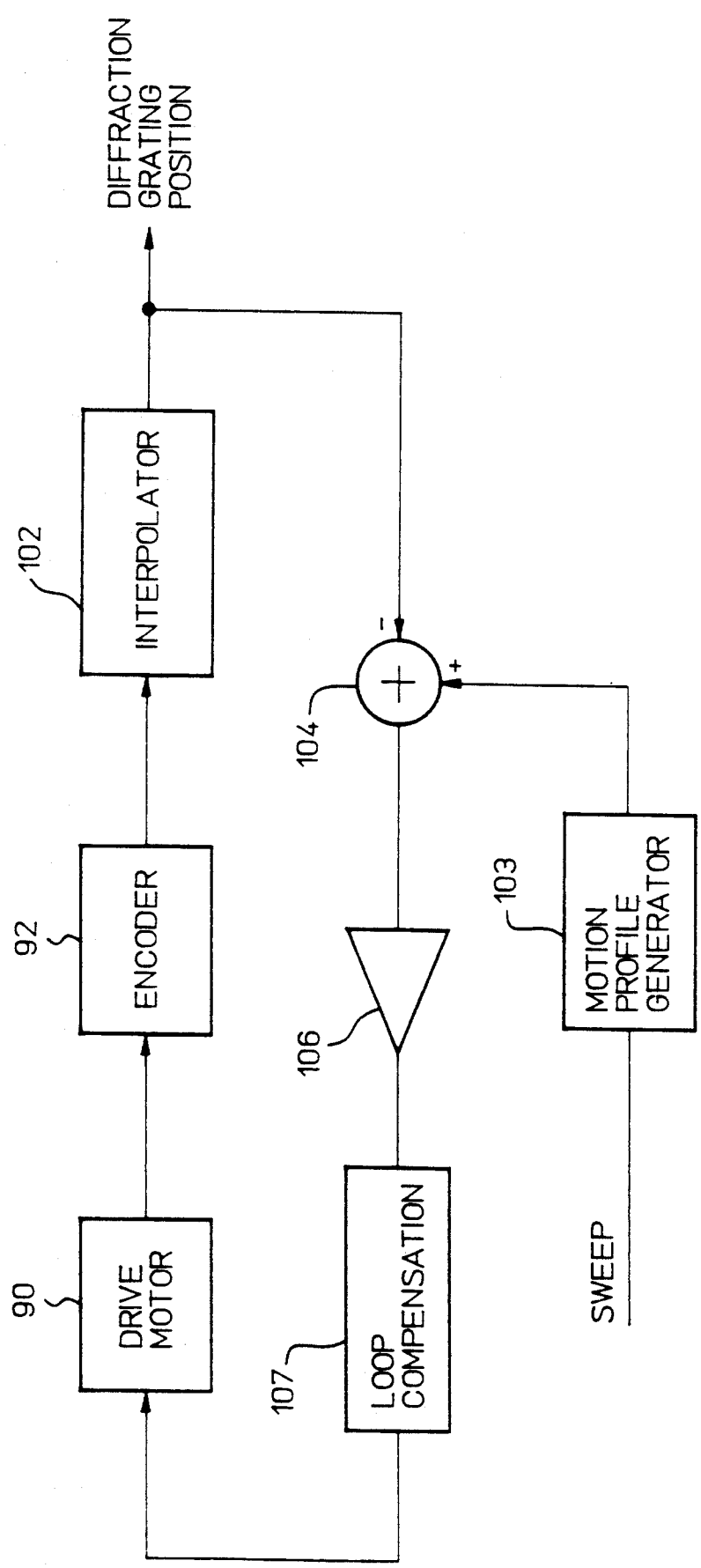
FIGS. 7A and 7B are block diagrams that illustrate the diffraction grating position sensing and position control.

A block diagram of the diffraction grating sweep and position sensing system is shown in FIG. 7A. As discussed above, the drive motor 90 and the encoder 92 are directly coupled to the drive shaft 88 of diffraction grating 16 to reduce the mechanical errors associated with gear trains. The direct drive configuration requires a high torque motor for fast starting and stopping and high speed scanning. In a preferred embodiment, the drive motor 90 comprises a frameless, brushless DC torque motor consisting of a permanent magnet rotor and a wound stator. The permanent magnet rotor uses samarium cobalt magnets and is mounted directly to the shaft 88 which holds the diffraction grating 16. The motor is 60.3 millimeters in diameter and about 17 millimeters thick and is capable of producing a continuous torque of 20 Newton-centimeters. The motor is driven with pulse width modulation at 22 kHz using a type LM628 motion control integrated circuit, available from National Semiconductor.

The direct drive configuration also requires a high resolution device for sensing the angular position of the diffraction grating 16. In a preferred embodiment, a sine wave output incremental optical shaft angle encoder with 9000 lines on the rotating disk is utilized with an interpolator 102 to provide high resolution. Alternatively, a resolver or other high resolution angular feedback device can be used. The encoder 92 is used with interpolation between zero crossings of the encoder outputs to produce 2.304 million counts per rotation of shaft 88. The output of interpolator 102 and encoder 92 is a digital representation of the diffraction grating position. The diffraction grating position information is utilized by a digital signal processor with the electrical output of the detector to generate a display of the optical spectrum. The diffraction grating position is also used in a servo loop to control drive motor 90. A digital sweep profile is generated by a motion profile generator 103. The output of the motion profile generator 103 and the sensed grating position are input to a summing unit 104 to produce an error signal representative of the error between the desired grating position and the actual grating position. The error signal is delivered through an amplifier 106 and a loop compensation filter 107 to motor 90. The motion profile generator 103, the summing unit 104, the amplifier 106 and the loop compensation filter 107 are all implemented digitally in the LM628 motion control integrated circuit.

Figure 7B:
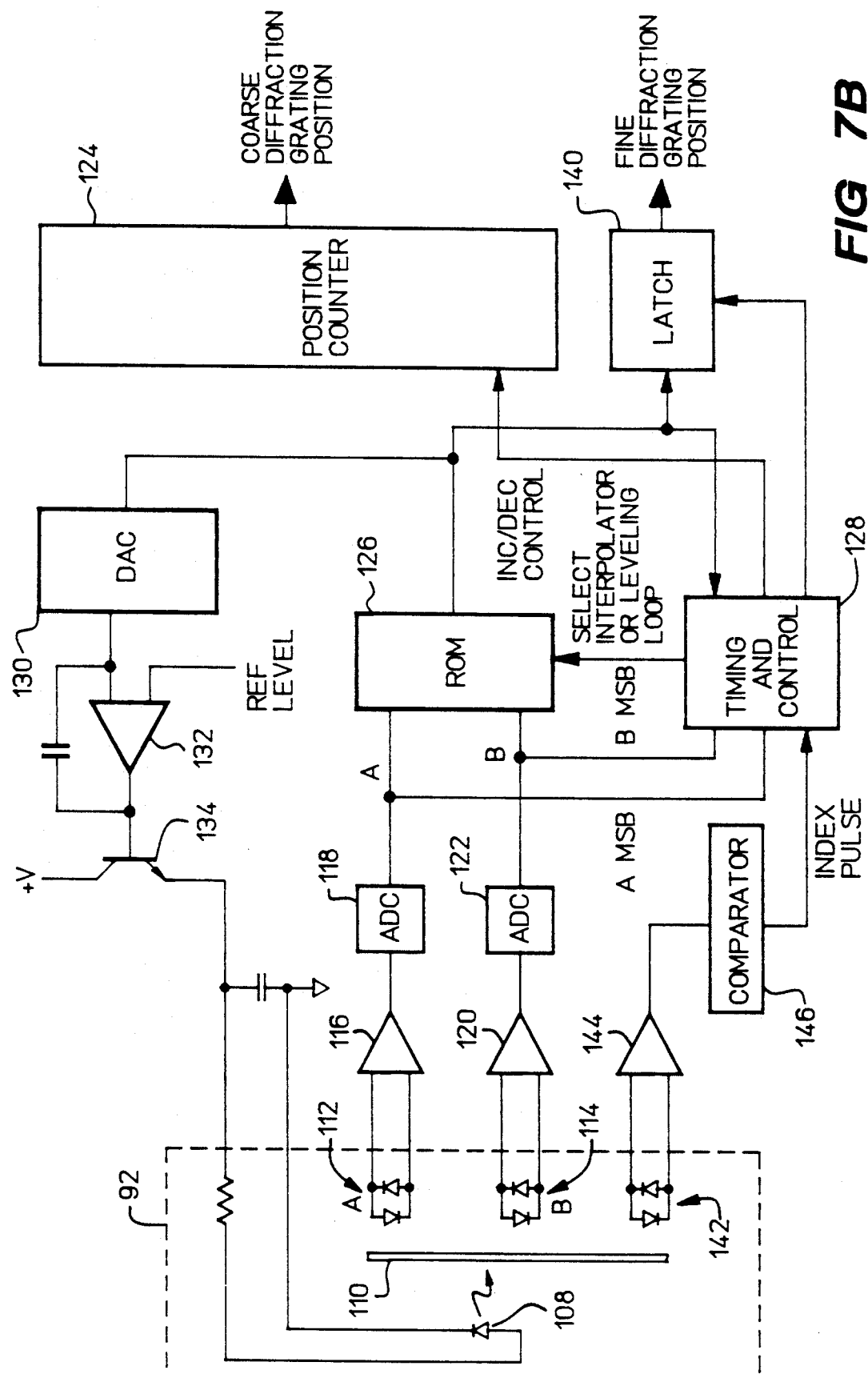

A block diagram of encoder 92 and interpolator 102 is shown in FIG. 7B. A light emitting diode 108 directs a light beam through slits in a disk 110 attached to drive shaft 88. The disk 110 preferably includes 9000 radial slits for encoding the diffraction grating position. The light passing through the slits in disk 110 is detected by an A channel detector 112 and a B channel detector 114, each comprising photodetectors. The outputs of detectors 112 and 114 are sine waves that are 90° out of phase. There are 9000 cycles of a sine wave output for one shaft revolution, for each encoder channel output. The output of A detector 112 passes through an amplifier 116 to an analog-to-digital converter 118. The output of B detector 114 passes through an amplifier 120 to an analog to-digital converter 122.

Each zero crossing of the A and B channels increments or decrements (depending on the relative phase of the A and B channels) a position counter 124 to provide coarse position information. The MSB outputs of analog to digital converters 118 and 122 are input to a timing and control unit 128 for incrementing or decrementing the counter 124 at the zero crossings of the A and B signals. Interpolation provides additional position information between the zero crossings of the sine wave signals. Between each zero crossing, the angle is a function of the arc tangent A/B. The sine wave outputs of A detector 112 and B detector 114 are digitized by analog to digital converters 118 and 122, respectively. The outputs of analog-to digital converters 118 and 122 are input to a ROM 126. The output of ROM 126 is the value of the arc tangent A/B. The output of the ROM 126, which is stored in a latch 140, is combined with position counter 124 to provide the interpolated information as to diffraction grating position. The ROM output is also put through a format translation (parallel to two phase serial) to match the input format required by the LM628 control IC.

The interpolation includes an amplitude leveling loop for encoder 92, which ensures that the signals from A detector 112 and B detector 114 remain at a constant amplitude. In a leveling mode, a control signal from the timing and control unit 128 is applied to ROM 126 to address a section that stores a function $(A^2+B^2)^{\frac{1}{2}}$. In the leveling mode, the ROM output, representative of input signal magnitude, is supplied through a digital-to analog converter 130 to an amplifier 132. The amplifier 132 controls a transistor 134 which supplies drive current to the light emitting diode 108. The drive current for LED 108 is controlled in a servo loop such that the current is increased when the outputs of detectors 112 and 114 decrease, and vice-versa. As a result, the sine and cosine peak amplitudes of encoder 92 are maintained constant, even though the LED efficiency changes with time, temperature and aging.

As indicated above, the disk 110 in encoder 92 has multiple slits for position encoding. In addition, the disk 110 includes a single index slit which establishes a reference position. The encoder must be synchronized to a reference position in order to determine absolute position. The light passing through the index slit in disk 110 is detected by an index detector 142. The output of index detector 142 passes through an amplifier 144 and a comparator 146 to provide an index pulse to timing and control unit 128.

The diffraction grating 16 is selected to minimize scattering and reflections and to minimize anomalies in the output direction. For the case of the planar diffraction grating, the preferred diffraction grating 16 has a parallel groove configuration with grooves parallel to axis of rotation 50. While various groove configurations can be utilized, a grating having 900 grooves per millimeter is preferred for operation over a wavelength range of 600-1700 nanometers. Standard groove profiles for this wavelength range can be used, with the preferred profile being asymmetric for higher efficiency. The grating is typically fabricated as an optically flat blank having a reflective coating in the wavelength range of operation. A preferred coating is gold.

The micropositioning assembly 80 for positioning the output optical fiber 42 relative to the output light beam 36 is a biaxial micropositioning stage for movement in a single plane. As described above, the micropositioning assembly 80 tracks the focused output light beam 36 to ensure efficient coupling into optical fiber 42 as diffraction grating 16 is scanned. In this application, the micropositioning stage 80 must meet the following requirements. The output optical fiber 42 must be held in the focal plane of the output light beam 36 within tens of micrometers. This means that there must be little or no movement in a Z direction along the optical fiber axis during translation in X and Y directions perpendicular to the optical fiber axis. The micropositioning assembly must provide submicron resolution and have smooth operation. It must be free of roughness from rolling elements, free of friction from sliding members and free of screw or gear backlash. In addition, the assembly must be immune to changes in orientation and relatively insensitive to vibration and environmental disturbances. The micropositioning assembly 80 must provide approximately ±200 micrometers of travel in X and Y directions and have a fast response time.

Figure 8A:
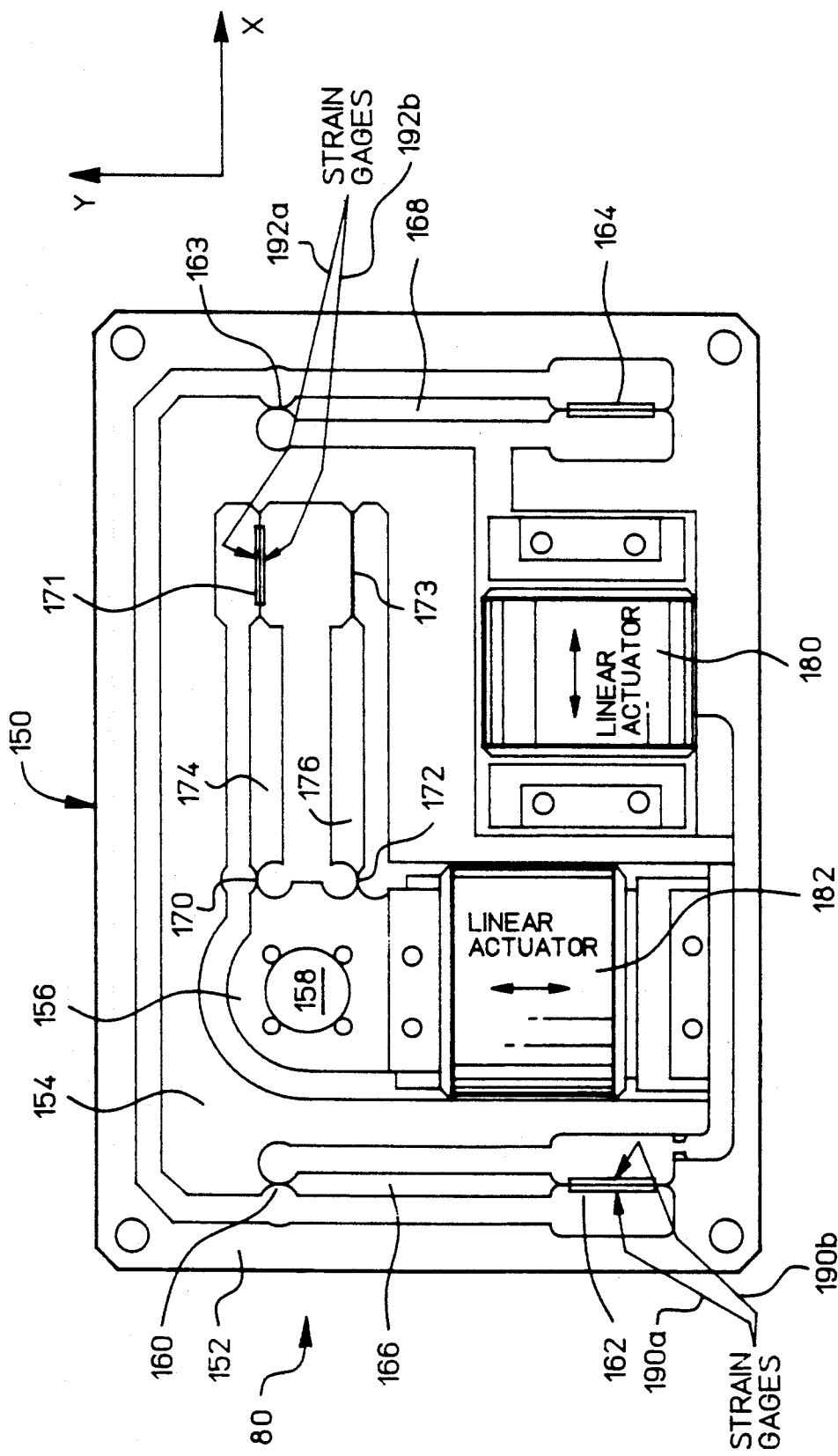
FIGS. 8A and 8B are front and perspective views, respectively, of the micropositioning assembly for positioning the output optical fiber in the double-pass scanning monochromator.
Figure 8B:
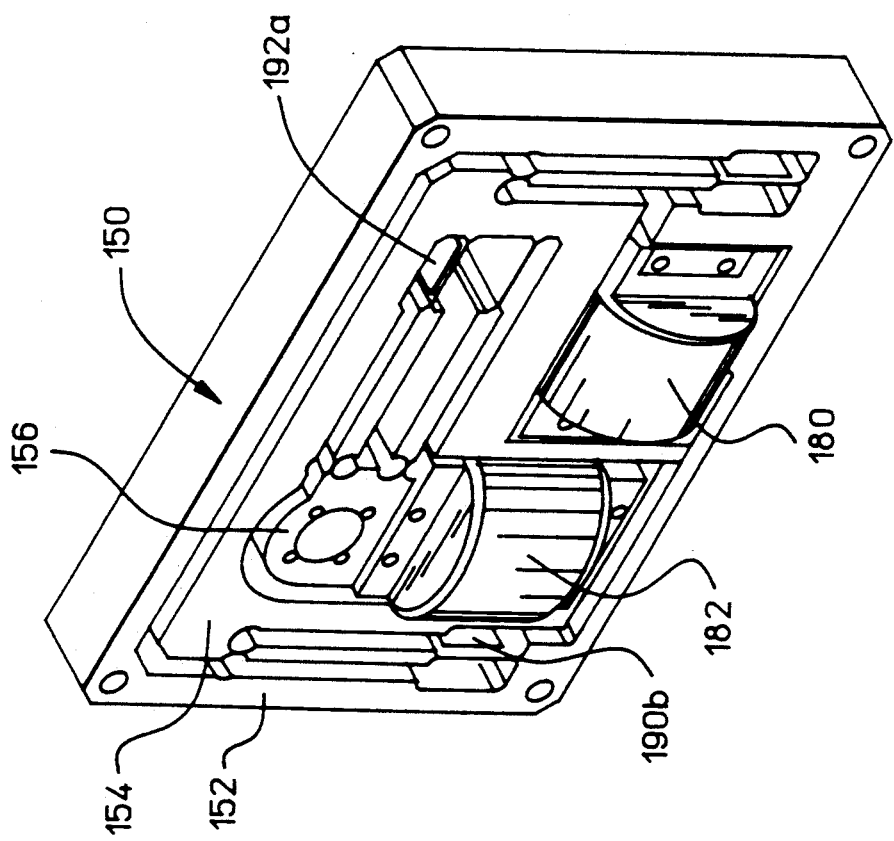

A preferred micropositioning assembly 80 is shown in FIGS. 8A and 8B. A major component of the micropositioning assembly is a biaxial flexure plate 150. The flexure plate 150 is typically machined from a metal such as aluminum, and includes a fixed section 152, an intermediate section 154 and a movable collar 156. The flexure plate 150 preferably has a thickness of 8 millimeters or more to limit Z axis movement. The fixed section 152 is mounted to the housing 60 of the monochromator (see FIGS. 2 and 3) and remains stationary during operation. The collar 156 is dimensioned for attachment to optical fiber adaptor 82, and includes an opening 158 through which optical fiber 42 passes. The collar 156 is movable in X and Y directions as described below. The intermediate section 154 is attached to fixed section 152 by flexures 160, 162, 163 and 164. Flexure 160 is interconnected to flexure 162 by a beam 166. Flexure 163 is interconnected to flexure 164 by a beam 168. Flexures 160 and 163 are right circular flexures, and flexures 162 and 164 are beam flexures. The flexure arrangement between fixed section 152 and intermediate section 154 permits movement of intermediate section 154 in the X direction relative to fixed section 152.

The movable collar 156 is attached to intermediate section 154 by flexures 170, 171, 172 and 173. Flexures 170 and 171 are interconnected by a beam 174, and flexures 172 and 173 are interconnected by a beam 176. Flexures 170 and 172 are right circular flexures, and flexures 171 and 173 are beam flexures. Flexures 170, 171, 172 and 173 permit movement of collar 156 in the Y direction relative to intermediate section 154.

A linear actuator 180, or voice coil motor, is mounted between fixed section 152 and intermediate section 154. The linear actuator 180 causes X direction movement of intermediate section 154 relative to fixed section 152. A linear actuator 182 is mounted between intermediate section 154 and collar 156. The linear actuator 182 causes Y direction movement of collar 156 relative to intermediate section 154. The linear actuators 180 and 182 are similar to voice coils used in loudspeakers. A preferred linear actuator comprises a coil of wire which moves in a fixed radial magnetic field when a current is applied. The fixed magnetic field is produced by neodymium iron-boron magnets in the actuator housing. The actuator is capable of producing a continuous force of 1.67 Newtons.

In order to accurately control the position of collar 156, the collar position is sensed, and the sensed position is provided to a servo control loop. In the micropositioning assembly 80, the X direction position is sensed by strain gages 190a and 190b affixed to opposite sides of beam flexure 162. The Y direction of collar 156 is sensed by strain gages 192a and 192b affixed to opposite sides of beam flexure 171. The strain gages are securely bonded to the respective beam flexures and exhibit a change in resistance in response to bending of the flexure. The change in resistance of each strain gage is representative of the position of collar 156.

Figure 9:
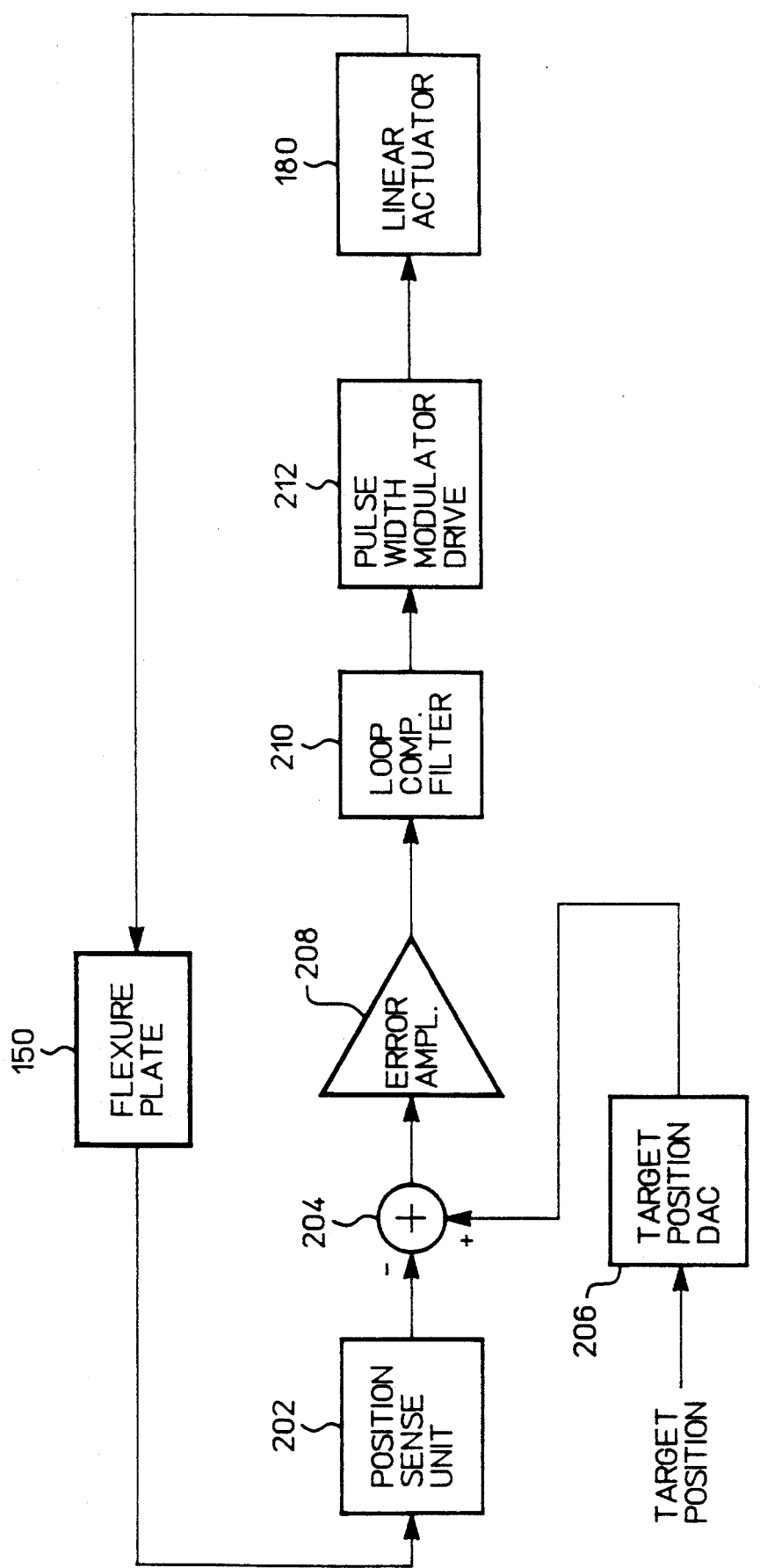
FIG. 9 is a block diagram of a servo loop for one axis of the micropositioning assembly of FIGS. 8A and 8B.

A block diagram of a control loop for one axis of the micropositioning assembly 80 is shown in FIG. 9. A similar control loop is used for each direction of movement. A position sense unit 202 provides a position output to a summing unit 204. The position sense unit contains the strain gages for one direction of movement and is described in detail below. A desired position is input in digital form from the digital signal processor to a digital to analog converter (DAC) 206. The analog output of DAC 206 is input to summing unit 204. The output of summing unit 204 is an error signal representative of the difference between the desired position and the actual position of collar 156 in one direction. The error signal passes through an error amplifier 208 to a loop compensation filter 210. The biaxial flexure plate 150 has several high Q resonances. The loop compensation filter 210 includes a twin Tee notch filter and an elliptical low pass filter. The zeros in the elliptical filter response and the twin Tee notch filter are each located to attenuate peaks in the flexure response at 900 Hz and 2.2 kHz. The output of loop compensation filter 210 is input to a pulse width modulator drive 212 which provides an actuating signal to linear actuator 180. The linear actuator 180 in turn moves intermediate section 154 relative to fixed section 152 to reduce the error signal. A control loop having the same configuration is used for control of linear actuator 182. The control signals for linear actuator 182 are derived from strain gages 192a and 192b.

Figure 10:
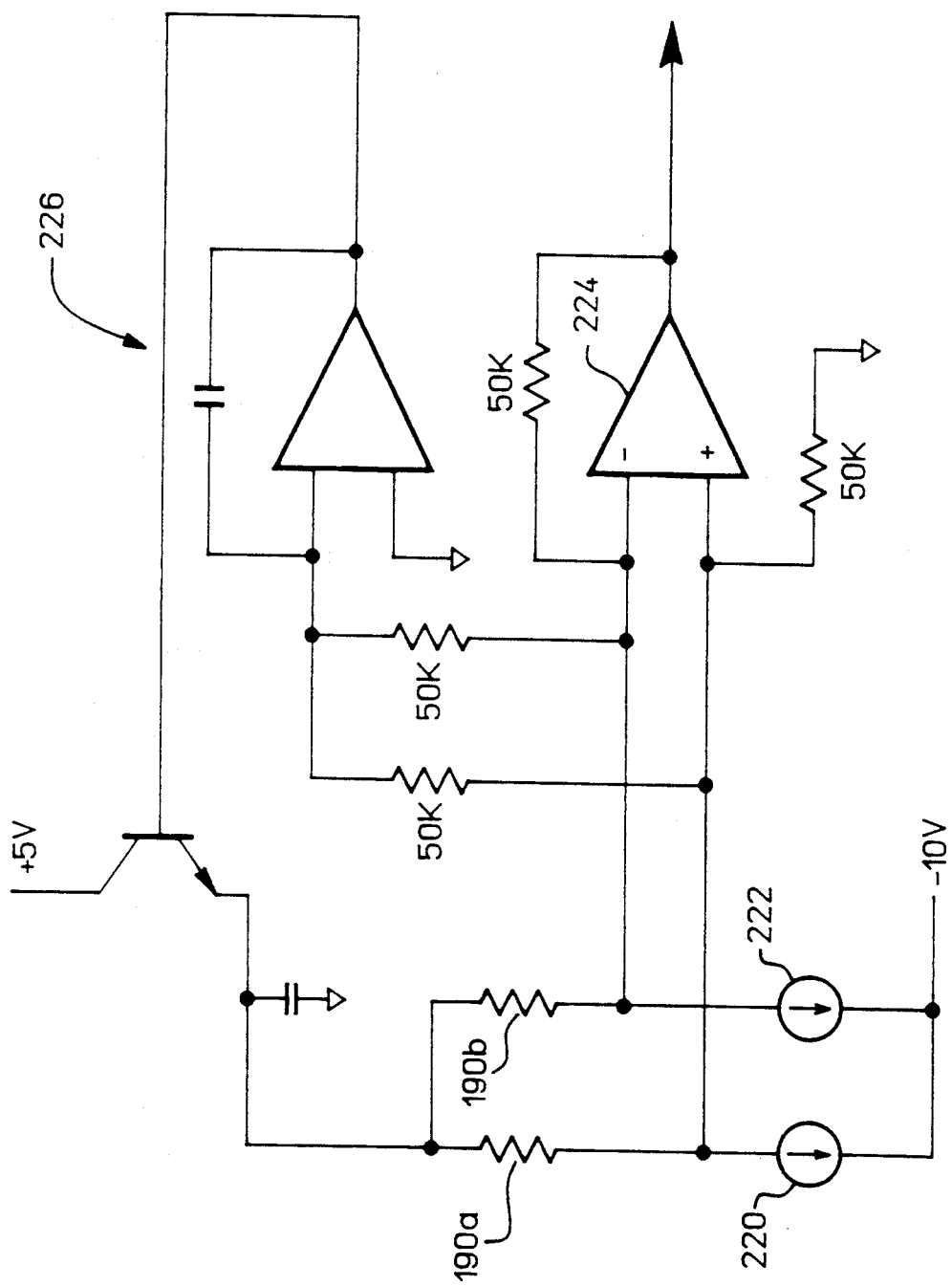
FIG. 10 is schematic diagram of a strain gage amplifier used in the micropositioning assembly of FIGS. 8A and 8B.
Figure 11A:
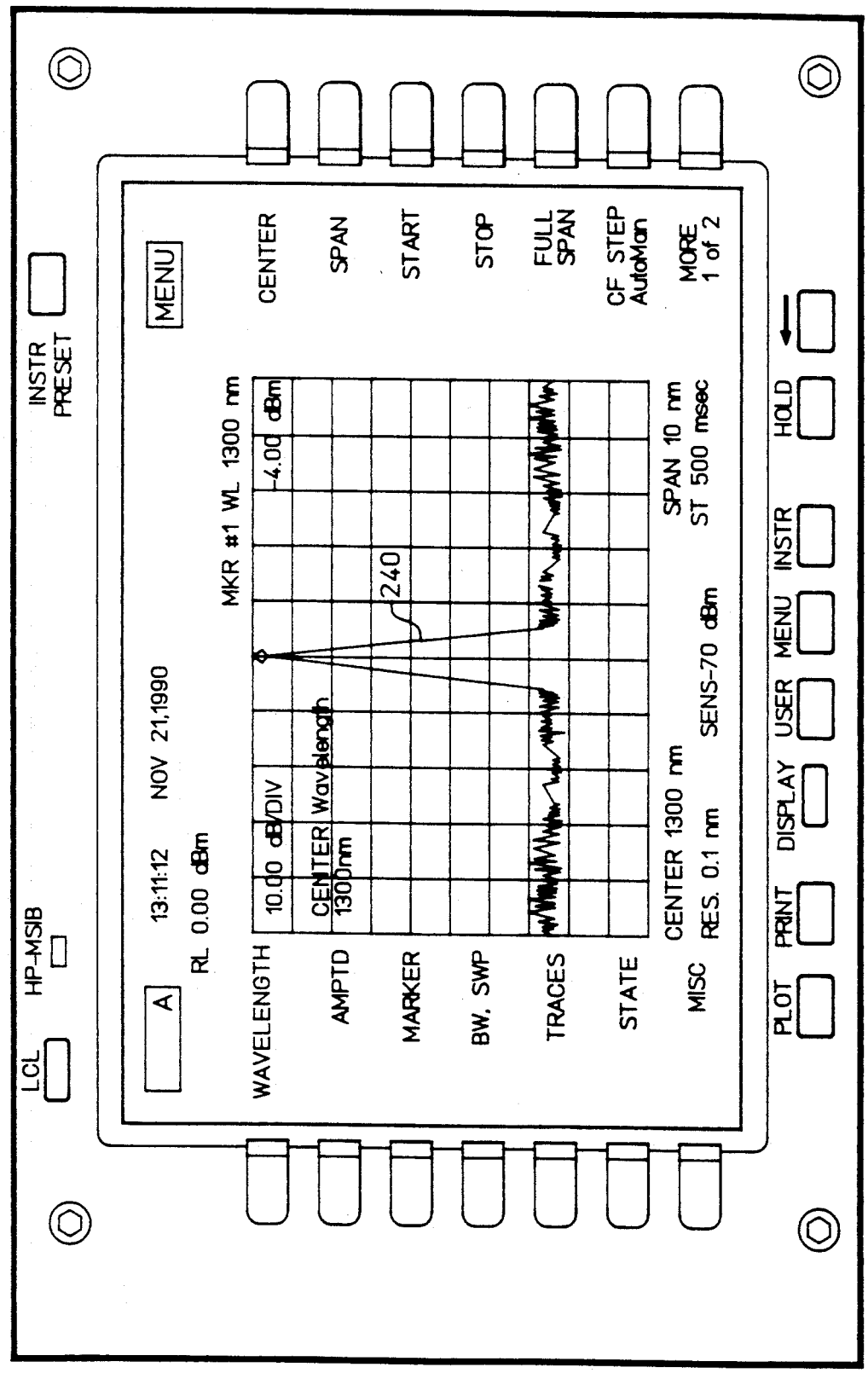
Figure 11B:
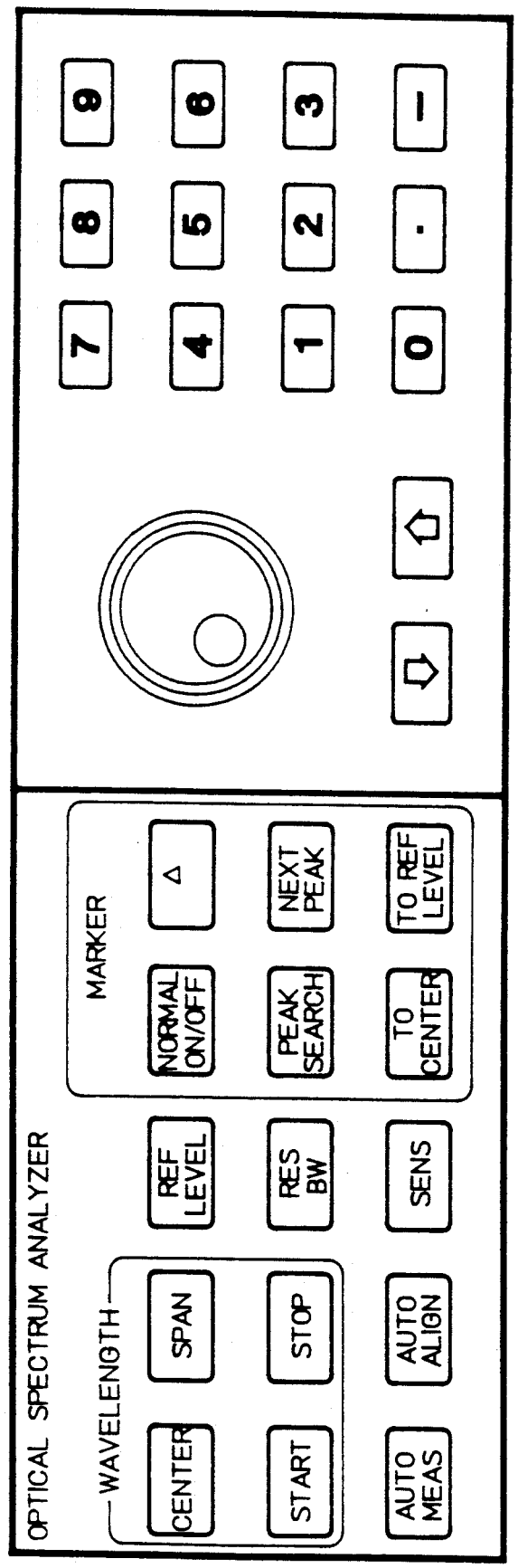
Figure 11C:
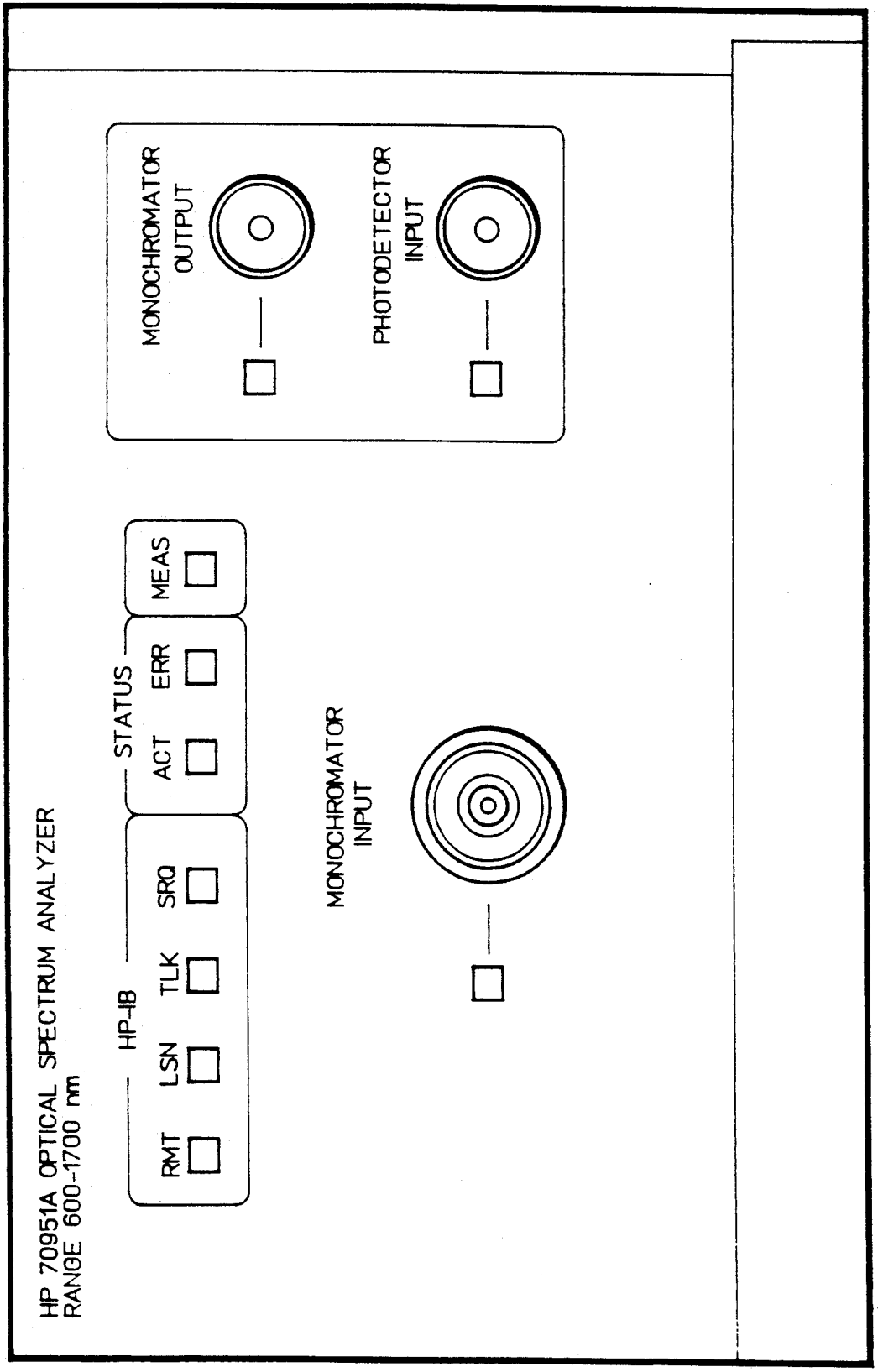
Figure 11D:
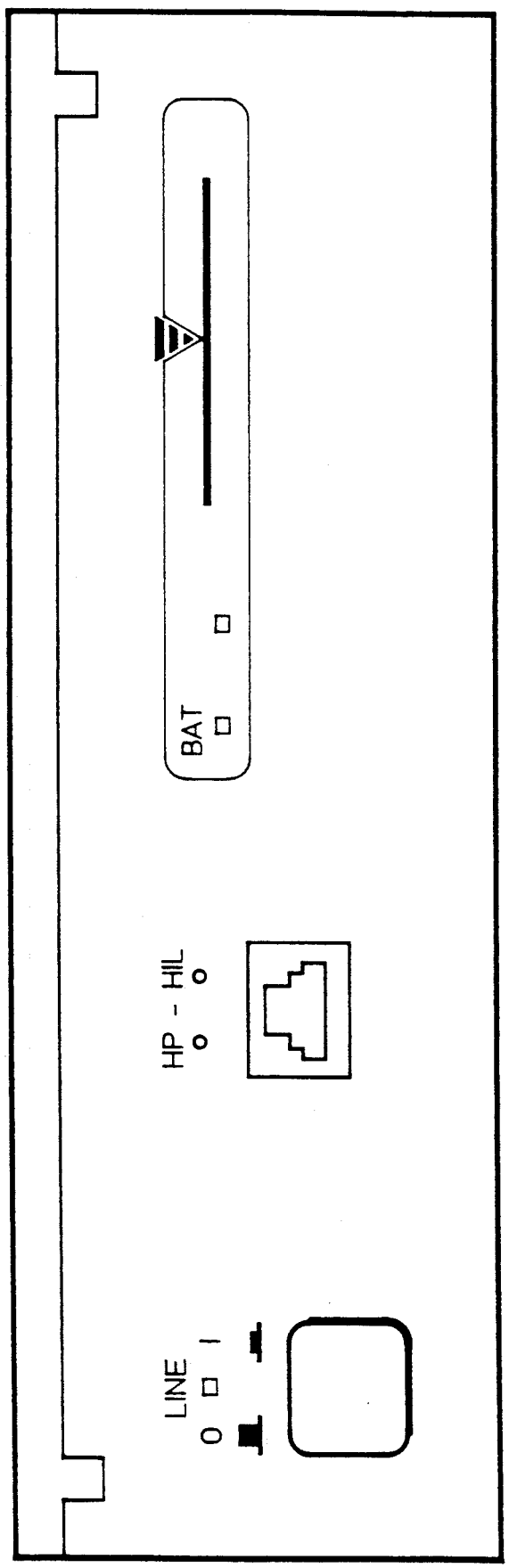

The position sense unit 202 is shown in FIG. 10. Strain gages 190a and 190b are connected in a bridge circuit. Movement of the flexure causes an imbalance in the bridge. Strain gage 190a is connected in series with a current source 220 between positive and negative voltage supplies. Strain gage 190b is connected in series with a current source 222 between the positive and negative voltage supplies. The current sources 220 and 222 are closely matched and track closely with temperature variations. The strain gages 190a and 190b are connected to the inverting and noninverting inputs of a strain gage amplifier 224. A voltage supply loop 226 maintains the common mode voltage on the strain gage amplifier 224 at zero, thereby removing errors due to common mode gain in the strain gage amplifier 224. When flexure 162 is flexed as a result of movement of intermediate section 154, the resistance of one strain gage increases, and the resistance of the other strain gage decreases, thereby causing an imbalance in the bridge circuit and an output from strain gage amplifier 224.

Tracking of the output light beam 36 is accomplished as follows. During initial calibration of the instrument, the position of the output light beam 36 is measured as a function of wavelength using a tunable wavelength input to the monochromator. Each input wavelength corresponds to a different rotational position of the diffraction grating 16 about axis 50. The X and Y direction translations of micropositioning assembly 80 to provide accurate alignment between optical fiber 42 and output light beam 36 are stored in a ROM for each rotational position of the diffraction grating 16. During operation of the instrument, the diffraction grating position is generated as shown in FIGS. 7A and 7B and described above. During scanning by diffraction grating 16, the position information is used to address the ROM that stores the required X and Y translations. This information is loaded into the X and Y target position DAC's at appropriate times. Thus, the optical fiber 42 automatically tracks the output light beam 36 during scanning.

The micropositioning assembly 80 is advantageously used to perform optical chopping to provide increased dynamic range and stable sensitivity on long sweeps. The optical detector 46 is required to detect a DC photocurrent in the presence of electrical noise and stray light. Electrical noise is generated in the optical detector 46 and the amplifier 48. Stray light results from undesired reflections and scattering within the monochromator. For example, a portion of input light beam 12 may be reflected from lens 14 rather than passing through it.

Inherent in any detection system is unwanted energy, commonly called noise. In an optical detection system, the noise can be both electrical and optical. When the output of the optical detector is sampled, it provides signal + noise. This can be a significant problem when the signal power and the noise power are of comparable magnitude. Usually, the electrical noise component is random and has an average value of zero. It is well known to average the signal + noise such that the noise component is effectively averaged to zero. However, very low frequency electrical noise, commonly called DC drift, requires very long averaging times. Chopping or synchronous detection, wherein the signal is interrupted or blocked periodically and the noise or drift is measured, has been used to remove low frequency electrical noise. Since the noise is measured at a time very close to the signal, drifts are effectively removed. Prior art optical spectrum analyzers usually utilize a separate mechanical component for chopping or periodically interrupting the light beam. This adds cost and complexity to the system. Furthermore, the chopping only removes the electrical portion of the noise. The stray light described above is not removed by conventional chopping in which the detector is blocked.

In accordance with a feature of the invention, the micropositioning assembly 80 is used to move the optical fiber 42 out of the output light beam. This is accomplished by energizing the micropositioning assembly 80 to move optical fiber 42 in one or both directions such that it no longer intercepts the output light beam 36. Preferably, the optical fiber 42 is moved in a direction perpendicular to the dispersion axis of the monochromator. Assuming that the stray light in the monochromator is approximately uniform over the small deflection of optical fiber 42, the output of optical detector 46 represents stray light L + electrical noise N. When the optical fiber 42 and the output light beam 36 are aligned, the optical detector 46 provides an output that represents signal S + stray light L + electrical noise N. The stray light and electrical noise components measured when the optical fiber is displaced from the output light beam are subtracted from the measurement when the fiber and the light beam are aligned to effectively remove both the stray light L and electrical noise N and provide an accurate measurement of signal S. Conventional chopping techniques do not remove the stray light component from the measurement, since the optical detector is blocked during chopping. As a result, more accurate measurement of the signal S is obtained with the above described technique. The optical chopping technique disclosed herein is typically used with relatively long sweep times, such as sweeps of more than 40 seconds.

The optical chopping technique disclosed herein is preferably implemented by energizing the micropositioning assembly 80 to move the optical fiber 42 out of alignment with the output light beam 36. However, it will be understood that the optical chopping technique can be implemented by displacing any optical element in the monochromator which causes the output light beam 36 to be displaced from alignment with optical fiber 42.

An optical spectrum analyzer display obtained from the double-pass scanning monochromator is shown in FIG. 11. A spectrum 240 shown in FIG. 11 is an artists' representation of a typical optical spectrum display. The spectrum 240 is a plot of amplitude on the vertical axis as a function of wavelength on the horizontal axis. The amplitude is the output of amplifier 48. The wavelength information is obtained from the position output of the diffraction grating control loop as shown in FIGS. 7A and 7B. By utilizing the diffraction grating position information, the spectrum 240 is more accurate than optical spectrum analyzers which rely upon timing relative to the start of a scan. The wavelength information is independent of velocity variations during scanning of diffraction grating 16.

The double pass scanning monochromator of the present invention provides a number of advantages in comparison with prior art monochromator configurations. In the disclosed monochromator, the optical output fiber does not limit the resolution bandwidth. The optical output is relatively insensitive to the polarization of the input light beam. The time dispersion caused by the diffraction grating is eliminated, since the dispersed light beam is recombined. The user is not required to adjust the output optical fiber to maintain alignment with the output light beam. An optical output provides the same wavelength span and range that are available internally. A small optical detector having low noise is utilized. The double pass monochromator provides the sensitivity of a single stage monochromator with the close in dynamic range of two cascaded monochromators. The synchronization problems and the added optics associated with a two stage monochromator are eliminated. The monochromator design is more rugged and compact than prior art monochromators. A single optical detector and associated electronics are utilized.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A double-pass scanning monochromator comprising:
    means for providing an input light beam;
    a diffraction grating for diffracting the input light beam along a dispersion axis to produce a spatially dispersed light beam;
    a slit for passing a selected portion of said dispersed light beam to produce a filtered light beam;
    means for rotating said diffraction grating such that said dispersed light beam is scanned along said dispersion axis;
    means for directing said filtered light beam to said diffraction grating such that said filtered light beam is recombined by said diffraction grating to produce an output light beam; and
    an output aperture for passing a selected portion of said output light beam to provide increased selectivity, whereby a high close-in dynamic range is achieved.

2. A double-pass scanning monochromator as defined in claim 1 wherein said means for providing an input light beam comprises an input optical fiber.

3. A double-pass scanning monochromator as defined in claim 1 wherein said output aperture comprises an output optical fiber.

4. A double-pass scanning monochromator as defined in claim 1 further including an optical detector for converting said output light beam to an output electrical signal.

5. A double-pass scanning monochromator as defined in claim 1 further including means for rotating the polarization components of said dispersed light beam or said filtered light beam by about 90° between incidences on said diffraction grating.

6. A double-pass scanning monochromator as defined in claim 5 wherein said means for rotating comprises a half wave plate.

7. A double-pass scanning monochromator as defined in claim 1 further including means for causing relative movement between said output aperture and said output light beam such that said output aperture and said output light beam remain in alignment during rotation of said diffraction grating.

8. A double-pass scanning monochromator as defined in claim 7 wherein said output aperture comprises an output optical fiber and wherein said means for causing relative movement comprises means for translating said output optical fiber in a plane perpendicular to said output light beam to track said output light beam during rotation of said diffraction grating.

9. A double pass scanning monochromator as defined in claim 8 wherein said means for translating said output optical fiber comprises a biaxial flexure plate having a movable element, means for sensing the position of said movable element in said plane, linear actuators for causing movement of said movable element in said plane and feedback means responsive to the sensed position of said movable element and to a desired position of said movable element for controlling said linear actuators.

10. A double pass scanning monochromator as defined in claim 1 further including optical means for collimating said input light beam prior to incidence on said diffraction grating, for focusing said dispersed light beam at or near said slit, for collimating said filtered light beam prior to incidence on said diffraction grating and for focusing said output light beam at or near said output aperture.

11. A double pass scanning monochromator as defined in claim 10 wherein said optical means comprises a lens having an optical axis.

12. A double pass scanning monochromator as defined in claim 11 wherein said input light beam and said dispersed light beam are displaced by equal first distances on opposite sides of the optical axis of said lens and wherein said filtered light beam and said output light beam are displaced by equal second distances on opposite sides of the optical axis of said lens.

13. A double pass scanning monochromator as defined in claim 12 wherein center rays of said input light beam, said dispersed light beam, said filtered light beam and said output light beam lie in a plane.

14. A double-pass scanning monochromator as defined in claim 1 wherein said means for rotating said diffraction grating comprises a drive shaft rigidly connected to said diffraction grating and defining an axis of rotation, and a motor for rotating said drive shaft about said axis of rotation, and wherein said monochromator further includes means directly connected to said drive shaft for sensing the rotational position of said drive shaft and feedback means responsive to the sensed rotational position and to a sweep signal for controlling said motor.

15. A double-pass scanning monochromator as defined in claim 14 wherein said motor is directly connected to said drive shaft.

16. A double pass scanning monochromator as defined in claim 1 further including a drive shaft rigidly connected to said diffraction grating and defining an axis of rotation and means directly connected to said drive shaft for sensing the rotational position of said diffraction grating.

17. A double pass scanning monochromator as defined in claim 4 further including means for causing relative movement between said output light beam and said output aperture such that the output electrical signal of said optical detector is representative only of stray light in the monochromator and electrical noise generated by the optical detector.

18. A double pass scanning monochromator as defined in claim 4 further including means for displacing said output aperture relative to said output light beam such that the output electrical signal of said optical detector is representative only of stray light in the monochromator and electrical noise generated by the optical detector.

19. A double-pass scanning monochromator as defined in claim 10 wherein said optical means comprises a single lens for collimating said input light beam, for focusing said dispersed light beam, for collimating said filtered light beam and for focusing said output light beam.

20. A double-pass scanning monochromator as defined in claim 1 further including means defining a plurality of slits having different widths and means for positioning a selected one of said slits in said dispersed light beam to provide a selected resolution.

21. A scanning monochromator comprising:
means for providing an input light beam;
a diffraction grating for diffracting the input light beam along a dispersion axis to produce a spatially dispersed light beam;
means for rotating said diffraction grating such that said dispersed light beam is scanned along the dispersion axis;
means for converting said dispersed light beam into an output light beam;
an output aperture for receiving said output light beam; and
means for causing movement of said output aperture such that said output light beam and said output aperture remain in alignment during rotation of said diffraction grating.

22. A scanning monochromator as defined in claim 21 wherein said output aperture comprises an output optical fiber and wherein said means for causing movement comprises means for translating said output optical fiber in a plane perpendicular to said output light beam to track said output light beam during rotation of said diffraction grating.

23. A scanning monochromator as defined in claim 22 further including means for storing calibration values representative of the position of said output light beam during rotation of said diffraction grating, said calibration values being used to control said translation means during rotation of said diffraction grating.

24. A scanning monochromator as defined in claim 22 wherein said means for translating said output optical fiber comprises a biaxial flexure plate having a movable element, means for sensing the position of said movable element in said plane, linear actuators for causing movement of said movable element in said plane and feedback means responsive to the sensed position of said movable element and to a desired position of said movable element for controlling said linear actuators.

25. A scanning monochromator comprising:
means for providing an input light beam;
a diffraction grating for diffracting the input light beam along a dispersion axis to produce a spatially dispersed light beam;
means for rotating said diffraction grating such that said dispersed light beam is scanned along the dispersion axis;
means for converting said dispersed light beam into an output light beam;
an output aperture for receiving said output light beam;
an optical detector coupled to said output aperture for converting said output light beam to an output electrical signal; and
means for causing displacement of said output aperture such that the output electrical signal of said optical detector is representative only of stray light in the monochromator and electrical noise generated by the optical detector.

26. A scanning monochromator as defined in claim 25 wherein said output aperture comprises an output optical fiber and wherein said means for causing displacement comprises means for displacing said output optical fiber relative to said output light beam.

27. A scanning monochromator as defined in claim 26 wherein said means for displacing said output optical fiber comprises a biaxial flexure plate having a movable element, means for sensing the position of said movable element in said plane, linear actuators for causing movement of said movable element in said plane and feedback means responsive to the sensed position of said movable element and to a desired position of said movable element for controlling said linear actuators.

28. A scanning monochromator comprising:
means for providing an input light beam;
a first stage monochromator including a first diffraction grating for diffracting the input light beam and mean for rotating said first diffraction grating, said first stage monochromator providing a first stage output light beam;
a second stage monochromator including a second diffraction grating for diffracting the first stage output light beam and means for rotating said second diffraction grating, said second stage monochromator providing a second stage output light beam; and means for rotating the polarization components of said first stage output light beam by 90° prior to incidence on said second diffraction grating such that the second stage output light beam is substantially independent of the polarization of said input light beam.

29. A scanning monochromator as defined in claim 28 wherein said means for rotating the polarization components of said first stage output light beam by 90° comprises a half-wave plate.

30. A method for detecting the output light beam of a monochromator having an output aperture, said method comprising the steps of:

detecting an output of the monochromator with the output aperture accurately aligned with an output light beam to provide a first measurement;

displacing the output aperture so that the output light beam is no longer incident on the output aperture;

detecting the output of the monochromator with the output aperture displaced from the output light beam to provide a second measurement; and subtracting the second measurement from the first measurement to provide an accurate measurement of the output light beam.

31. A double-pass scanning monochromator comprising:

means for providing an input light beam;

a diffraction grating for diffracting the input light beam along a dispersion axis to produce a spatially dispersed light beam;

a slit for passing a selected portion of said dispersed light beam to produce a filtered light beam;

means for rotating said diffraction grating such that said dispersed light beam is scanned along said dispersion axis, said means for rotating said diffraction grating comprising a drive shaft rigidly connected to said diffraction grating and defining an axis of rotation, a motor for rotating said drive shaft about said axis of rotation, a shaft angle encoder directly connected to said drive shaft for sensing the rotational position of said diffraction grating, and feedback means responsive to the sensed rotational position and to a sweep signal for controlling said motor;

means for directing said filtered light beam to said diffraction grating such that said filtered light beam is recombined by said diffraction grating to produce an output beam;

an output aperture for receiving said output light beam;

an optical detector coupled to said output aperture for converting said output light beam to an output electrical signal;

means for translating said output aperture in a plane perpendicular to said output light beam to track said output light beam during rotation of said diffraction grating, said means for translating said output aperture including means for displacing said output aperture relative to said output light beam in an optical chopping mode such that the output electrical signal of said optical detector is representative of stray light in the monochromator and electrical noise generated by the optical detector; and means for rotating the polarization components of said dispersed light beam or said filtered light beam by about 90°.

32. An optical spectrum analyzer comprising:

means for providing an input light beam;

a diffraction grating for diffracting the input light beam along a dispersion axis to produce a spatially dispersed light beam;

a slit for passing a selected portion of said dispersed light beam to produce a filtered light beam;

means for rotating said diffraction grating such that said dispersed light beam is scanned along said dispersion axis;

means for sensing the position of said diffraction grating and providing a diffraction grating position signal;

means for directing said filtered light beam is recombined by said diffraction grating to produce an output light beam;

an output aperture for passing a selected portion of said output light beam to provide increased selectivity, whereby a high close-in dynamic range is achieved;

an optical detector coupled to said output aperture for converting said output light beam to an output electrical signal; and means for displaying said output electrical signal as a function of said diffraction grating position signal to provide a display of the optical spectrum of said input light beam.

33. A method for analyzing a light beam with a scanning monochromator, comprising the steps of:

providing an input light beam;

diffracting the input light beam along a dispersion axis with a diffraction grating to produce a spatially dispersed light beam;

passing a selected portion of said dispersed light beam through a slit to produce a filtered light beam;

rotating said diffraction grating such that said dispersed light beam is scanned along said dispersion axis;

directing said filtered light beam to said diffraction grating such that said filtered light beam is recombined by said diffraction grating to produce an output light beam; and directing said output light beam through an output aperture for passing a selected portion of said output light beam to provide increased sensitivity, thereby achieving a high close-in dynamic range.

34. A method as defined in claim 33 wherein the step of directing the output light beam through an output aperture comprises directing said output light beam to an output optical fiber.

35. A method for intercepting the output light beam of a monochromator having a rotating diffraction grating and an output aperture, said method comprising the steps of:

measuring the position of said output light beam relative to said output aperture as said diffraction grating is rotated to provide calibration values; and causing movement of said output aperture in response to said calibration values so that said output light beam and said output aperture remain in alignment during rotation of said diffraction grating.

36. A scanning monochromator comprising:

means for providing an input light beam;

a first stage monochromator including a first diffraction grating for diffracting the input light beam and means for rotating said first diffraction grating. said first stage monochromator providing a first stage output light beam;

a second stage monochromator including a second diffraction grating for diffracting the first stage output light beam and means for rotating said second diffraction grating. said second diffraction grating diffracting said first stage output light beam such that said first stage output light beam is recombined by said second diffraction grating to provide a second stage output light beam; and an output aperture for passing a selected portion of said second stage output light beam to provide increased selectivity, whereby a high close-in dynamic range is achieved.

37. A scanning monochromator as defined in claim 36 wherein said output aperture comprises an output optical fiber.

* * * * *

UNITED STATES PATENT AND TRADEMARK OFFICE
CERTIFICATE OF CORRECTION

PATENT NO. : 5,233,405
DATED : Aug. 3, 1993
INVENTOR(S) : Kenneth R. Wildnauer, et al.

It is certified that error appears in the above-indentified patent and that said Letters Patent is hereby corrected as shown below:

Col. 10, Line 2, "Clearly, misalignment" should read -- Clearly, misalignment --

Col. 13, Line 58, "Standard qroove" should read -- Standard groove --

Col. 20, Line 62, "mean for rotating" should read -- means for rotating --

Col. 22, Line 17, "light beam is recombined by said diffraction grating to produce an output light beam" should read -- light beam to said diffraction grating such that said filtered light beam is recombined by said diffraction grating to produce an output light beam --

Signed and Sealed this

Nineteenth Day of April, 1994

Attest:

BRUCE LEHMAN

*Attesting Officer*      *Commissioner of Patents and Trademarks*